United States Patent
Endo et al.

(10) Patent No.: US 9,592,716 B2
(45) Date of Patent: Mar. 14, 2017

(54) PRESSURE DAMPING DEVICE

(71) Applicant: SHOWA CORPORATION, Gyoda-shi (JP)

(72) Inventors: Hiroshi Endo, Gyoda (JP); Nobuo Mori, Gyoda (JP)

(73) Assignee: SHOWA CORPORATION, Gyoda-Shi (JP)

( * ) Notice: Subject to any disclaimer, the term of this patent is extended or adjusted under 35 U.S.C. 154(b) by 147 days.

(21) Appl. No.: 14/063,265

(22) Filed: Oct. 25, 2013

(65) Prior Publication Data

US 2014/0144737 A1 May 29, 2014

(30) Foreign Application Priority Data

Nov. 28, 2012 (JP) ................. 2012-260375
Apr. 18, 2013 (JP) ................. 2013-087407

(51) Int. Cl.
*F16F 9/00* (2006.01)
*F16F 9/34* (2006.01)
(Continued)

(52) U.S. Cl.
CPC ............ *B60G 17/08* (2013.01); *F16F 9/3214* (2013.01); *F16F 9/3405* (2013.01); *F16F 9/504* (2013.01); *F16F 9/5126* (2013.01)

(58) Field of Classification Search
CPC ........ F16F 7/00; F16F 9/00; F16F 9/10; F16F 9/103; F16F 9/14; F16F 9/16; F16F 9/3207;
(Continued)

(56) References Cited

U.S. PATENT DOCUMENTS 4,274,517 A * 6/1981 Kato ................ F16F 9/364
188/315
4,383,595 A * 5/1983 Schnitzius ............ 188/281
(Continued)

FOREIGN PATENT DOCUMENTS

CN 101903678 A 12/2010
CN 102549296 A 7/2012
(Continued)

OTHER PUBLICATIONS

Japanese Office Action mailed Oct. 22, 2014 for the corresponding Japanese Application No. 2013-087407.
(Continued)

*Primary Examiner* — Melody Burch
(74) *Attorney, Agent, or Firm* — Leason Ellis LLP

(57) ABSTRACT

A pressure damping device includes: a cylinder; a piston provided movably in the cylinder in an axial direction of the cylinder, and formed to have a plurality of channels for liquid; a moving and partitioning member located between the piston and the cylinder, and provided movably from one end to the other end in the axial direction of a movable region provided in the piston, and configured to partition a space in the cylinder into a first liquid chamber and a second liquid chamber for storing the liquid; a first opening and closing member configured to open and close an opening in at least a part of the plurality of channels of the piston and open the opening; and a second opening and closing member configured to open and close an opening in at least a part of the plurality of channels and open the opening.

15 Claims, 13 Drawing Sheets

(51) Int. Cl.
*B60G 17/08* (2006.01)
*F16F 9/504* (2006.01)
*F16F 9/512* (2006.01)
*F16F 9/32* (2006.01)

(58) Field of Classification Search
CPC .......... F16F 9/3214; F16F 9/3235; F16F 9/34; F16F 9/3405; F16F 9/348; F16F 9/504; F16F 9/5126; B60G 13/00; B60G 13/06; B60G 17/08
See application file for complete search history.

(56) References Cited

U.S. PATENT DOCUMENTS

| | | | | |
|---|---|---|---|---|
| 4,632,228 | A * | 12/1986 | Oster et al. | 188/282.1 |
| 4,796,871 | A * | 1/1989 | Bauer et al. | 267/64.11 |
| 4,826,207 | A * | 5/1989 | Yoshioka | F16F 9/468 188/282.4 |
| 5,823,306 | A | 10/1998 | de Molina | |
| 5,971,117 | A * | 10/1999 | Grundei et al. | 188/288 |
| 6,318,523 | B1 * | 11/2001 | Moradmand et al. | 188/280 |
| 6,321,725 | B1 * | 11/2001 | Krimmer | F02M 25/0836 123/516 |
| 7,726,451 | B2 | 6/2010 | Hammer et al. | |
| 7,757,826 | B2 * | 7/2010 | Hayama et al. | 188/282.2 |
| 8,113,324 | B2 | 2/2012 | Baalmann et al. | |
| 8,201,669 | B2 * | 6/2012 | Ko | 188/280 |
| 8,245,822 | B2 | 8/2012 | Ji et al. | |
| 8,544,619 | B2 * | 10/2013 | Yamaguchi et al. | 188/285 |
| 2010/0078276 | A1 | 4/2010 | Ko | |
| 2011/0017557 | A1 | 1/2011 | Nygren et al. | |
| 2012/0168268 | A1 | 7/2012 | Bruno et al. | |

FOREIGN PATENT DOCUMENTS

| | | |
|---|---|---|
| JP | S59-10536 U | 1/1984 |
| JP | S59-10537 U | 1/1984 |
| JP | S59-92233 U | 6/1984 |
| JP | S59-172849 U | 11/1984 |
| JP | S59-172850 U | 11/1984 |
| JP | H04-74753 U | 6/1992 |
| JP | H04-99440 U | 8/1992 |
| JP | H06-307484 A | 11/1994 |
| JP | 2007-2994 A | 1/2007 |
| JP | 2011-158016 A | 8/2011 |
| JP | 2011-202789 A | 10/2011 |

OTHER PUBLICATIONS

Office Action mailed Oct. 16, 2015 for the corresponding Chinese Application No. 201310530631.X.

* cited by examiner

PRESSURE DAMPING DEVICE

CROSS-REFERENCE TO RELATED APPLICATIONS

This application is based on and claims priority under 35 U.S.C. 119 from Japanese Patent Application Nos. 2012-260375 filed on Nov. 28, 2012 and 2013-087407 filed on Apr. 18, 2013, the entire content of which is incorporated herein by reference.

BACKGROUND

1. Technical Field

The present invention relates to a pressure damping device.

2. Related Art

In a suspension device of a vehicle such as an automobile, a pressure damping device including a damping force generator that appropriately reduces vibration transmitted from a road surface to a vehicle body during traveling is provided. In the pressure damping device of this type, a technique for changing generated damping force according to the amplitude and the frequency (speed) of a piston, which complicatedly changes according to a state of a road surface on which the vehicle travels, is used.

For example, JP-A-2011-202789 discloses a damping force adjusting structure of a pressure damping device in which a pressure receiving area with respect to a back pressure chamber of a damping valve is set to be larger than a pressure receiving area with respect to pressurized one oil chamber of the damping valve and a contact position of a backup collar on the rear surface of the damping valve is arranged further on the inner circumferential side of the damping valve than a contact position of a piston round of a piston on the front surface of the damping valve.

SUMMARY OF INVENTION

Concerning generation of damping force of a pressure damping device, it is difficult to attain both of steering stability and riding comfort. In general, it is conceivable to increase damping force when amplitude relatively increases, for example, when a vehicle travels on an extremely bumpy road surface or the posture of the vehicle greatly changes. However, when the damping force is simply increased, a problem of a paradoxical relation occurs in that, since damping force in the case of small amplitude on a fine road or the like also increases, riding comfort is deteriorated. Further, the pressure damping device preferably has a simple configuration because, for example, it is possible to reduce product variation and attain a reduction in cost.

It is an object of the present invention to realize, with a simple configuration, a pressure damping device that can change damping force according to amplitude.

Under such an object, according to an aspect of the present invention, there is provided a pressure damping device including: a cylinder configured to store liquid; a piston provided movably in the cylinder in an axial direction of the cylinder and formed to have a plurality of channels for the liquid; a moving and partitioning member located between the piston and the cylinder and provided movably from one end to the other end in the axial direction of a movable region provided in the piston, and configured to partition a space in the cylinder into a first liquid chamber and a second liquid chamber for storing the liquid; a first opening and closing member configured to open and close an opening in at least a part of the plurality of channels of the piston and open the opening when the moving and partitioning member is located at the one end of the movable region of the piston; and a second opening and closing member configured to open and close an opening in at least a part of the plurality of channels on the opposite side to a side of the plurality of channels of the piston opened and closed by the first opening and closing member and open the opening when the moving and partitioning member is located at the other end of the movable region of the piston.

The pressure damping device may further include a second piston that is provided on the first liquid chamber side of the cylinder to form a third liquid chamber for storing the liquid in the space in the cylinder, and that has a plurality of channels for communicating the first liquid chamber and the third liquid chamber with each other, in which the pressure damping device causes the second piston to generate damping force in a state in which the moving and partitioning member is moving between the one end and the other end and causes the piston and the second piston to generate the damping force in a state in which the moving and partitioning member is located at the one end or the other end.

Under such an object, according to another aspect of the present invention, there is provided a pressure damping device including: a cylinder configured to store liquid; a piston provided movably in the cylinder in an axial direction of the cylinder and formed to have a plurality of channels for the liquid; a moving and partitioning member provided movably in the axial direction on a side of the piston and configured to partition a space in the cylinder into a first liquid chamber and a second liquid chamber for storing the liquid; and a second piston provided on the first liquid chamber side of the cylinder to form a third liquid chamber for storing the liquid in the space in the cylinder, and having a plurality of channels for communicating the first liquid chamber and the third liquid chamber with each other.

The pressure damping device may have a configuration in which the piston has a recess formed in a circumferential direction on a side of the piston, and the moving and partitioning member has an annular shape and is movably attached in the recess of the piston.

Further, the pressure damping device may have a configuration in which the moving and partitioning member moves with respect to the piston as a result of operation of the piston and changes capacities of the first liquid chamber and the second liquid chamber and limits the change of the capacities of the first liquid chamber and the second liquid chamber when a position of the moving and partitioning member with respect to the piston is fixed.

Under such an object, according to still another aspect of the present invention, there is provided a pressure damping device including: a cylinder configured to store liquid; a piston that is provided movably in an axial direction of the cylinder in the cylinder, and formed to have a plurality of channels for the liquid; a moving and partitioning member provided in a position in the axial direction of the cylinder different from a position of the piston in the cylinder and movably from one end to the other end in the axial direction of a movable region extending along the axial direction of the cylinder and configured to partition a space in the cylinder into a first liquid chamber and a second liquid chamber for storing the liquid; a first opening and closing member configured to open and close an opening in at least a part of the plurality of channels of the piston and open the opening when the moving and partitioning member is located at the one end of the movable region of the piston;

and a second opening and closing member configured to open and close an opening in at least a part of the plurality of channels on the opposite side to a side of the plurality of channels of the piston opened and closed by the first opening and closing member and open the opening when the moving and partitioning member is located at the other end of the movable region of the piston.

The pressure damping device may further include a limiting member that is an annular member provided in the cylinder and configured to limit a flow of the liquid flowing in the axial direction of the cylinder, in which the limiting member has a cutout formed in a part in a circumferential direction thereof.

The pressure damping device may further include a damping material configured to reduce a bumping impact of the moving and partitioning member, in which the damping material is provided on at least one of the one end side and the other end side in the movable region of the moving and partitioning member.

Further, the pressure damping device may further include an urging member provided to be opposed to an axial direction end of the cylinder in the moving and partitioning member and configured to urge the moving and partitioning member in the axial direction of the cylinder.

According to the present invention, it is possible to realize, with a simple configuration, a pressure damping device that can change damping force according to amplitude.

DESCRIPTION OF EMBODIMENTS

Embodiments of the present invention are explained in detail below with reference to the accompanying drawings.

Figure 1:
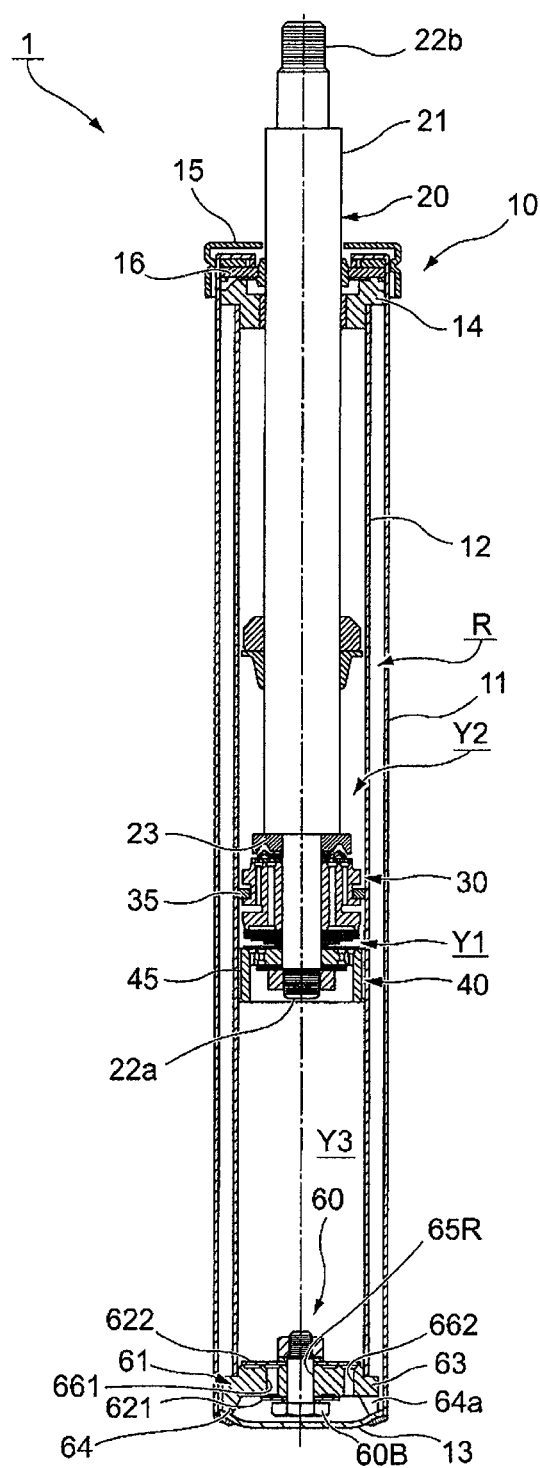
FIG. 1 is an overall configuration diagram of a hydraulic pressure damping device according to an embodiment.

FIG. 1 is an overall configuration diagram of a hydraulic pressure damping device 1 according to an embodiment.

Figure 2:
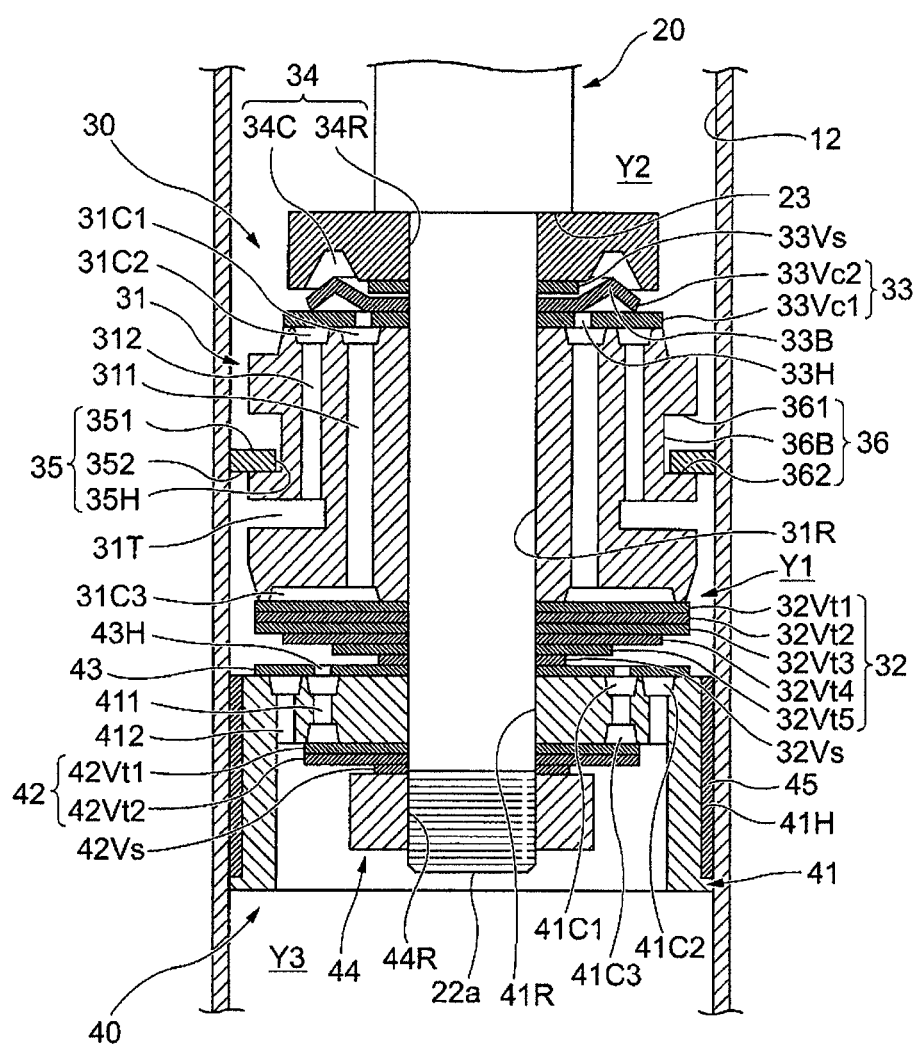
FIG. 2 is a diagram for explaining the hydraulic pressure damping device according to the embodiment in detail.

FIG. 2 is a diagram for explaining the hydraulic pressure damping device 1 according to the embodiment in detail.

As shown in FIG. 1, the hydraulic pressure damping device 1 is a double cylinder type hydraulic pressure damping device configuring a part of a suspension. The hydraulic pressure damping device 1 includes a cylinder section 10, a piston rod 20, a first piston valve 30, a second piston valve 40, and a bottom valve 60.

[Configuration and Functions of the Cylinder Section 10]

The cylinder section 10 includes a thin cylindrical outer cylinder 11, a thin cylindrical inner cylinder 12 housed in the outer cylinder 11, and a bottom cover 13 configured to close one end in a center axis direction (in FIG. 1, the up down direction) of a cylinder of the cylindrical outer cylinder 11.

In the following explanation, the center axis direction of the cylinder of the outer cylinder 11 is simply referred to as "axial direction". An end side on the lower side in the figure in the axial direction of the outer cylinder 11 is referred to as "one" and an end side on the upper side in the figure of the cylinder 11 is referred to as "the other".

The cylinder section 10 includes a rod guide 14 arranged on the inner side of the outer cylinder 11 and configured to guide the piston rod 20 and a bump stopper cap 15 configured to slide the piston rod 20 and attached to the other end in the axial direction of the outer cylinder 11. Further, the cylinder section 10 includes an oil seal 16 provided on the inner side of the bump stopper cap 15 and on the opposite side of a below-mentioned first piston 31 with respect to the rod guide 14 and configured to prevent a leak of liquid in the cylinder section 10 and mixing of foreign matters in the cylinder section 10.

In the cylinder section 10, the length in the axial direction in the outer cylinder 11 is larger than the length of the inner cylinder 12. The inner cylinder 12 is arranged concentrically with the outer cylinder 11. That is, one end in the axial direction in the inner cylinder 12 is supported by one end in the axial direction in the outer cylinder 11 via a below-mentioned valve body 61, which is one of components configuring the bottom valve 60, and the bottom cover 13. On the other hand, the other end in the axial direction in the inner cylinder 12 is supported by the rod guide 14. Consequently, the inner cylinder 12 is arranged concentrically with the outer cylinder 11 such that a gap between the outer circumference of the inner cylinder 12 and the inner circumference of the outer cylinder 11 is fixed in the axial direction. The outer circumferential surface of the inner cylinder 12 and the inner circumferential surface of the outer cylinder 11 form a reservoir chamber R.

In the hydraulic pressure damping device 1 according to this embodiment, as shown in FIG. 1, a space in which the liquid (in this embodiment, oil) in the inner cylinder 12 is encapsulated is partitioned into three regions of a first oil chamber Y1, a second oil chamber Y2, and a third oil chamber Y3 by a below-mentioned control ring 35 of the first piston valve 30 and a below-mentioned friction member 45 of the second piston valve 40.

Specifically, the third oil chamber Y3 is formed further on one side in the axial direction than the friction member 45 of the second piston valve 40. The first oil chamber Y1 is formed between the other side in the axial direction of the friction member 45 of the second piston valve 40 and one side in the axial direction of the control ring 35 of the first piston valve 30. The second oil chamber Y2 is formed further on the other side in the axial direction than the control ring 35 of the first piston valve 30.

Further, in the hydraulic pressure damping device 1 according to this embodiment, as shown in FIG. 1, the third oil chamber Y3 and the reservoir chamber R are partitioned by a below-mentioned valve body 61 of the bottom valve 60.

[Configuration and Functions of the Piston Rod 20]

The piston rod 20 extends in the axial direction and is connected to the first piston valve 30 and the second piston valve 40 at one end (in FIG. 1, the lower side) in the axial direction.

In this embodiment, the piston rod 20 is a solid or hollow bar-like member. The piston rod 20 includes a columnar or cylindrical rod section 21, includes, at one end in the axial direction, a one side attachment section 22a for attaching the first piston valve 30 and the second piston valve 40, and includes, at the other end in the axial direction, an other side attachment section 22b for attaching the piston rod 20 to a vehicle body or the like. Spiral grooves are cut to form male threads on the outer surfaces of the ends of the one side attachment section 22a and the other side attachment section 22b. The one side attachment section 22a and the other side attachment section 22b function as bolts.

The one side attachment section 22a has a step section 23 formed small in an outer diameter compared with the rod section 21 and functioning as a connecting place to the rod section 21.

[Configuration and Functions of the First Piston Valve 30]

The first piston valve 30 includes, as shown in FIG. 2, a first piston 31, which is an example of the piston, an extension side valve group 32, which is an example of the first opening and closing member, configured to close an end on one side in the axial direction in a part of a plurality of oil paths formed in the first piston 31, a valve seat 32Vs adjacent to the extension side valve group 32, a compression side valve group 33, which is an example of the second opening and closing member, configured to close an end on the other side in the axial direction in a part of the plurality of oil paths formed in the first piston 31, and a valve seat 33Vs adjacent to the compression side valve group 33. Further, the first piston valve 30 includes a valve stopper 34 and a control ring 35, which is an example of the moving and partitioning member.

The first piston 31 is a columnar member including the plurality of oil paths formed in the axial direction. The outer diameter of the first piston 31 is set small with respect to the inner diameter of the inner cylinder 12. Therefore, a gap is formed between the outer circumference of the first piston 31 and the inner circumferential surface of the inner cylinder 12. The gap forms a channel for the oil as explained below.

In the first piston 31, an attachment hole 31R formed in the axial direction in order to allow the one side attachment section 22a of the piston rod 20 to pass, a first oil path 311 formed in the axial direction in a region further on the outer side in the radial direction than the attachment hole 31R, and a second oil path 312 formed in the axial direction in a region further on the outer side in the radial direction than the first oil path 311 are formed.

Further, the first piston 31 includes a first annular groove section 31C1 and a second annular groove section 31C2 formed on an end face on the other side in the axial direction of the first piston 31, a third annular groove section 31C3 formed on an end face on one side in the axial direction, a side annular groove section 31T formed in the circumferential direction on the side surface of the first piston 31, and a ring moving and holding section 36, the cross section of which is formed in a recess shape, formed in the circumferential direction of the side surface of the first piston 31 further on the other side in the axial direction than the side annular groove section 31T.

In the first piston valve 30, the attachment hole 31R of the first piston 31 is fit with the one side attachment section 22a of the piston rod 20. Since a below-mentioned nut 44 of the second piston valve 40 is fixed to the male thread of the one side attachment section 22a, the first piston valve 30 is held in the piston rod 20 to be clamped by the second piston valve 40.

The first oil path 311 and the second oil path 312 are formed to extend in the axial direction of the first piston 31. The first oil path 311 is connected to the first annular groove section 31C1 on one side of the first piston 31 and connected to the third annular groove section 31C3 on the other side. The second oil path 312 is connected to the side annular groove section 31T on one side and connected to the second annular groove section 31C2 on the other side. A plurality of (in this embodiment, four) the first oil paths 311 and a plurality of (in this embodiment, four) the second oil paths 312 are formed in the circumferential direction at equal intervals. The first oil paths 311 and the second oil paths 312 communicate the first oil chamber Y1 and the second oil chamber Y2 each other when flows of the oil in the first oil chamber Y1 and the second oil chamber Y2 are generated.

The first annular groove section 31C1 is a groove formed in the circumferential direction at an end on the other side of the first piston 31 and is formed to connect the plurality of first oil paths 311. The second annular groove section 31C2 is a groove formed in the circumferential direction at the end on the other side of the first piston 31 and is arranged on the outer side of the first annular groove section 31C1 and formed to connect the plurality of second oil paths 312.

As shown in FIG. 2, in a state in which the compression side valve group 33 is attached to the first piston 31, the first annular groove section 31C1 and the second annular groove section 31C2 are entirely covered by a below-mentioned first valve 33Vc1. In this state, the first annular groove section 31C1 is opposed to below-mentioned oil holes 33H of the first valve 33Vc1.

The third annular groove section 31C3 is a groove formed in the circumferential direction at an end on one side of the first piston 31 and is formed to connect the plurality of first oil paths 311. In a state in which the extension side valve group 32 is attached to the first piston 31, the third annular groove section 31C3 is entirely covered by a first valve 32Vt1, a second valve 32Vt2, and a third valve 32Vt3 mentioned below.

The side annular groove section 31T is a groove formed in the radial direction from the outer circumference to the center of the first piston 31 and is formed to depth where the second oil paths 312 are formed. The side annular groove section 31T is formed to connect the plurality of second oil paths 312. The side annular groove section 31T forms an inflow section of the oil into the second oil paths 312 during a compression stroke.

The extension side valve group 32 is configured by superimposing a plurality of disc-like valve members in which bolt holes for allowing the one side attachment section 22a of the piston rod 20 to pass are formed. As shown in FIG. 2, the extension side valve group 32 in this embodiment is configured by five valves, i.e., a first valve 32Vt1 to a fifth valve 32Vt5. The first valve 32Vt1 is attached to be opposed to the third annular groove section 31C3 of the first piston 31. The second valve 32Vt2, the third valve 32Vt3, the fourth valve 32Vt4, and the fifth valve 32Vt5 are arranged to be superimposed to the outer side in this order on the first valve 32Vt1.

In this embodiment, the outer diameters of the first valve 32Vt1, the second valve 32Vt2, and the third valve 32Vt3 are set equal. The first valve 32Vt1, the second valve 32Vt2, and the third valve 32Vt3 have the largest outer diameter in the extension side valve group 32. The outer diameter is set larger than the diameter of the outer circumference of the third annular groove section 31C3. The outer diameters of the fourth valve 32Vt4, the fifth valve 32Vt5, and the valve seat 32Vs are set to be smaller in this order with respect to the outer diameter of the first valve 32Vt1, the second valve 32Vt2, and the third valve 32Vt3. The first valve 32Vt1 to the fifth valve 32Vt5 are configured to be respectively deformed with the valve seat 32Vs set as a fulcrum of a bend.

An end on the first oil chamber Y1 side (one side) of the first piston 31 is covered by the extension side valve group 32 configured as explained above and an opening and closing action of the first oil paths 311 is performed.

The compression side valve group 33 is configured by superimposing a plurality of disc-like valve members in which bolt holes for allowing the one side attachment section 22a of the piston rod 20 to pass are formed. As shown in FIG. 2, the compression side valve group 33 in this embodiment is configured by two valves, i.e., a first valve 33Vc1 and a second valve 33Vc2. The first valve 33Vc1 is attached to be opposed to the first annular groove section 31C1 and the second annular groove section 31C2 of the first piston 31. The second valve 33Vc2 and the valve seat 33Vs are arranged to be superimposed to the outer side in this order on the first valve 33Vc1.

In this embodiment, the second valve 33Vc2 is configured to be capable of moving in the axial direction and come into contact with and separate from the first valve 33Vc1. Specifically, as shown in FIG. 2, the second valve 33Vc2 is attached such that a gap movable between the first valve 33Vc1 and the valve seat 33Vs is formed.

The outer diameter of the first valve 33Vc1 is set larger than the outer diameter at an edge on the outer side of the second annular groove section 31C2. The first valve 33Vc1 includes a plurality of (in this embodiment, four) oil holes 33H. The oil holes 33H are arranged to be opposed to the first annular groove section 31C1 of the first piston 31.

The outer diameter of the second valve 33Vc2 is set smaller than the outer diameter of the first valve 33Vc1. As shown in FIG. 2, the second valve 33Vc2 includes a bent section 33B, the cross section of which is bent and formed in an annular shape. The bent section 33B is formed to form a space between the bent section 33B and the oil holes 33H of the first valve 33Vc1 and press the outer circumferential portion of the first valve 33Vc1 further on the outer side in the radial direction than the oil holes 33H.

The outer diameter of the valve seat 33Vs is set smaller than the outer diameter of the second valve 33Vc2. In this embodiment, the valve seat 33Vs is formed to be located on the inner side of the bent section 33B of the second valve 33Vc2. The valve seat 33Vs functions as a fulcrum of a bend when the first valve 33Vc1 and the second valve 33Vc2 are deformed.

An end on the second oil chamber Y2 side (the other side) of the first piston 31 is covered by the compression side valve group 33 configured as explained above and an opening and closing action for the first oil paths 311 or the second oil paths 312 is performed.

The valve stopper 34 is generally formed in a columnar shape. The valve stopper 34 includes an attachment hole 34R having an inner diameter, through which the one side attachment section 22a of the piston rod 20 can be pierced, and extending in the axial direction and an annular recess 34C provided on an end face on one side in the axial direction. The valve stopper 34 is held in the piston rod 20 when the one side attachment section 22a is fit in the attachment hole 34R and pushed in toward the step section 23.

The annular recess 34C is an annular recess formed to face the compression side valve group 33 side. In this embodiment, the annular recess 34C is formed in a position opposed to the bent section 33B of the second valve 33Vc2 of the compression side valve group 33. As explained below, when the second valve 33Vc2 is displaced or deformed according to the action of the second valve 33Vc2, the annular recess 34C forms a space for allowing the movement of the second valve 33Vc2.

The valve stopper 34 presses the compression side valve group 33 toward the first piston 31 while enabling opening and closing of the first oil paths 311 and the second oil paths 312 due to the deformation of the compression side valve group 33.

The control ring 35 is a ring-like (annular) member including an opening section 35H on the inner side. The inner diameter of the opening section 35H is set larger than the outer diameter on a below-mentioned bottom surface 36B of the ring moving and holding section 36. Consequently, the control ring 35 forms a gap in the radial direction between the ring moving and holding section 36 and the bottom surface 36B and is configured to be movable in the axial direction of the first piston 31.

The outer diameter of the control ring 35 is set to the same degree as the inner diameter of the inner cylinder 12. Consequently, the control ring 35 moves while coming into contact with the inner circumference of the inner cylinder 12.

The control ring 35 partitions a space in which the oil is encapsulated in the inner cylinder 12 into a first oil chamber Y1 formed further on one side in the axial direction than the control ring 35 and a second oil chamber Y2 formed further on the other side in the axial direction than the first piston 31.

The control ring 35 includes a first end face 351 facing the second oil chamber Y2 side (the other side) and a second end face 352 facing the first oil chamber Y1 side (one side), which are surfaces facing the axial direction. The width between the first end face 351 and the second end face 352 is set small compared with the distance between a first receiving section 361 and a second receiving section 362 mentioned below of the ring moving and holding section 36. Therefore, the control ring 35 can move relatively to the first piston 31 in the ring moving and holding section 36.

The ring moving and holding section 36 includes a bottom surface 36B configuring the bottom of a groove formed in the circumferential direction, a first receiving section 361, which is a surface formed in a direction perpendicular to the bottom surface 36B (the depth direction of the groove) and facing the first oil chamber Y1 side (one side), and a second receiving section 362, which is a surface facing the second oil chamber Y2 side (the other side). The ring moving and holding section 36 is formed on a side closer to the compression side valve group 33 than the side annular groove section 31T.

In this embodiment, the distance between the first receiving section 361 and the second receiving section 362 is set to be about twice as large as the width between the first end face 351 and the second end face 352. Consequently, the ring moving and holding section 36 movably holds the control ring 35 and stops the relative movement when the control ring 35 is received by the first receiving section 361 or the second receiving section 362.

[Configuration and Functions of the Second Piston Valve 40]

The second piston valve 40 includes a second piston 41, an extension side valve group 42 provided at an end on one side in the axial direction of the second piston 41, a valve seat 42Vs adjacent to the extension side valve group 42, a compression side valve 43 provided at an end on the other side in the axial direction, a nut 44 for holding the extension side valve group 42, and a friction member 45 attached to the outer circumference of the second piston 41.

As shown in FIG. 2, the second piston 41 is a member generally having a bottomed cylindrical shape and including a plurality of oil paths formed in the axial direction and the like. The second piston 41 comes into contact with the inner circumferential surface of the inner cylinder 12 via the friction member 45 provided on the outer circumferential surface of the second piston 41 and partitions a space in which the oil is encapsulated in the inner cylinder 12 into a third oil chamber Y3 formed further on one side in the axial direction than the second piston 41 and a first oil chamber Y1 formed further on the other side in the axial direction than the second piston 41.

In the second piston 41, an attachment hole 41R formed in the axial direction in order to allow the one side attachment section 22a of the piston rod 20 to pass, a first oil path 411 formed in the axial direction in a region further on the outer side in the radial direction than the attachment hole 41R, and a second oil path 412 formed in the axial direction in a region further on the outer side in the radial direction than the first oil path 411 are formed.

Further, the second piston 41 includes a first annular groove section 41C1 and a second annular groove section 41C2 formed on an end face on the other side (the second oil chamber Y2 side) in the axial direction of the second piston 41, a third annular groove section 41C3 formed on an end face on one side (the first oil chamber Y1 side) in the axial direction, and a ring holding section 41H formed in the circumferential direction on a side surface of the second piston 41.

In the second piston valve 40, the attachment hole 41R of the second piston 41 is fit with the one side attachment section 22a of the piston rod 20. The second piston valve 40 is held in the piston rod 20 when the nut 44 is fixed to the male thread of the one side attachment section 22a.

The first oil path 411 and the second oil path 412 are formed to pierce through the second piston 41 in the axial direction. A plurality of (in this embodiment, four) the first oil paths 411 and a plurality of (in this embodiment, four) the second oil paths 412 are formed at equal intervals in the circumferential direction. In this embodiment, the first oil paths 411 and the second oil paths 412 communicate the first oil chamber Y1 and the third oil chamber Y3 each other when flows of the oil are generated in the first oil chamber Y1 and the third oil chamber Y3.

The first annular groove section 41C1 is a groove formed in the circumferential direction at an end on the other side of the second piston 41 and is formed to connect the plurality of first oil paths 411. The second annular groove section 41C2 is a groove formed in the circumferential direction at the end on the other side of the second piston 41 and is arranged on the outer side of the first annular groove section 41C1 and formed to connect the plurality of second oil paths 412.

As shown in FIG. 2, in a state in which the compression side valve 43 is attached to the second piston 41, the first annular groove section 41C1 and the second annular groove section 41C2 are entirely covered by the compression side valve 43. In this state, the first annular groove section 41C1 is opposed to below-mentioned oil holes 43H of the compression side valve 43.

The third annular groove section 41C3 is a groove formed in the circumferential direction at an end on one side of the second piston 41 and is formed to connect the plurality of first oil paths 411. In a state in which the extension side valve group 42 is attached to the second piston 41, the third annular groove section 41C3 is entirely covered by a first valve 42Vt1 and a second valve 42Vt2 mentioned below.

The extension side valve group 42 is configured by superimposing a plurality of disc-like valve members in which bolt holes for allowing the one side attachment section 22a of the piston rod 20 to pass are formed. As shown in FIG. 2, the extension side valve group 42 in this embodiment is configured by two valves, i.e., a first valve 42Vt1 and a second valve 42Vt2. The first valve 42Vt1 is attached to be opposed to the third annular groove section 41C3 of the second piston 41. The second valve 42Vt2 and the valve seat 42Vs are arranged to be superimposed to the outer side on the first valve 42Vt1.

In this embodiment, the outer diameters of the first valve 42Vt1 and the second valve 42Vt2 are equal. The outer diameter of the first valve 42Vt1 and the second valve 42Vt2 is set larger than the outer diameter at an edge on the outer side of the third annular groove section 41C3 of the second piston 41 and smaller than the length to the second oil paths 412.

The outer diameter of the valve seat 42Vs is set smaller than the outer diameter of the first valve 42Vt1 and the second valve 42Vt2. In this embodiment, the valve seat 42Vs functions as a fulcrum of a bend when the first valve 42Vt1 and the second valve 42Vt2 are deformed.

An end on the third oil chamber Y3 side (one side) of the second piston 41 is covered by the extension side valve group 42 configured as explained above and an opening and closing action for the first oil paths 411 is performed.

The compression side valve 43 is configured by a disc-like valve member in which a bolt hole for allowing the one side attachment section 22a of the piston rod 20 to pass is formed. The diameter of the compression side valve 43 in this embodiment is set larger than the diameter of the outer circumference of the second annular groove section 41C2 of the second piston 41. The compression side valve 43 includes a plurality of (in this embodiment, four) oil holes 43H. The oil holes 43H are arranged to be opposed to the first annular groove section 41C1 of the second piston 41.

In this embodiment, the compression side valve 43 is arranged to be opposed to the valve seat 32Vs of the first piston valve 30. The outer diameter of the valve seat 32Vs is small with respect to the compression side valve 43. Therefore, the valve seat 32Vs functions as a fulcrum of a bend when the compression side valve 43 is deformed.

An end on the first oil chamber Y1 side (the other side) of the second piston 41 is covered by the compression side valve 43 and an opening and closing action of the second oil paths 412 is performed.

The nut 44 generally has a columnar shape. The outer diameter of the nut 44 is formed smaller than the outer diameter at an edge on the outer side of the third annular groove section 41C3 of the second piston 41. Further, the nut 44 includes an attachment hole 44R having an inner diameter through which the one side attachment section 22a of the piston rod 20 can be pierced and extending in the axial direction.

The nut 44 is held in the piston rod 20 when the one side attachment section 22a is fit in the attachment hole 44R. The nut 44 tightens the extension side valve group 42 toward the second piston 41 while enabling opening and closing of the first oil paths 411 due to deformation of the extension side valve group 42.

The friction member 45 is a ring-like member and is held in the outer circumference of the ring holding section 41H. The outer diameter of the friction member 45 is set the same as the outer diameter of the inner cylinder 12. Consequently, the friction member 45 moves while coming into contact with the inner circumference of the inner cylinder 12.

In this embodiment, a space in which the oil in the inner cylinder 12 is encapsulated is partitioned into the first oil chamber Y1 and the third oil chamber Y3 by the friction member 45. The friction member 45 generates predetermined damping force with friction between the friction member 45 and the inner cylinder 12 when the second piston 41 moves in the axial direction.

[Configuration and Functions of the Bottom Valve 60]

The bottom valve 60 includes, as shown in FIG. 1, a valve body 61 including a plurality of oil paths formed in the axial direction, a first valve 621 configured to close one end in the axial direction in a part of the plurality of oil paths formed in the valve body 61, a second valve 622 configured to close the other end in the axial direction in a part of the plurality of oil paths formed in the valve body 61, and a bolt 60B for fixing these members.

The valve body 61 includes a disc-like section 63 and a cylindrical section 64 extending in the axial direction from an outermost part in the radial direction of the disc-like section 63 and divides a closed space in the cylinder section 10.

In the disc-like section 63, a bolt hole 65R formed in the axial direction in order to allow the bolt 60B to pass, a first oil path 661 formed in the axial direction in a region further on the outer side in the radial direction than the bolt hole 65R, and a second oil path 662 formed in the axial direction in a region further on the outer side in the radial direction than the first oil path 661 are formed. A plurality of (in this embodiment, four) the first oil paths 661 and a plurality of (in this embodiment, four) the second oil paths 662 are formed at equal intervals in the circumferential direction and function as communication paths for communicating the third oil chamber Y3 and the reservoir chamber R each other.

[Operation of the Hydraulic Pressure Damping Device 1]

The operation of the hydraulic pressure damping device 1 configured as explained above is explained.

First, the operation during a compression stroke is explained.

Figure 3:
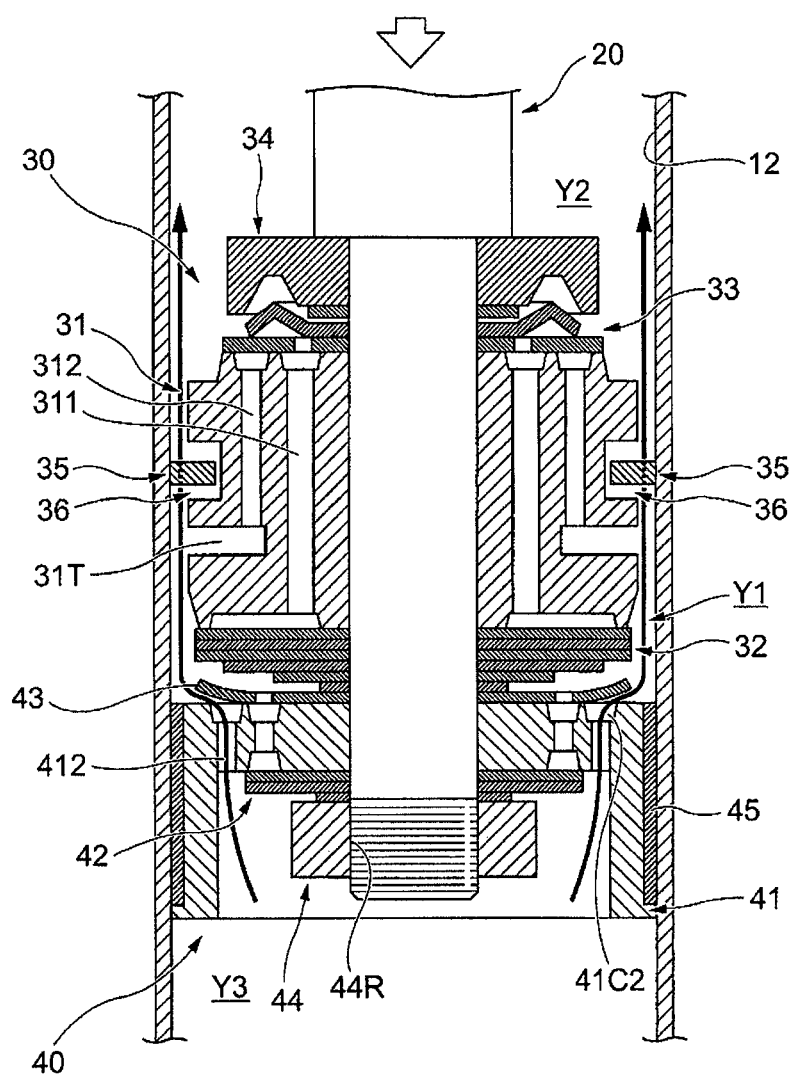
FIG. 3 is a diagram showing a flow of oil during a compression stroke in the case of movement at small amplitude.

FIG. 3 is a diagram showing a flow of the oil during the compression stroke in which the piston rod 20 moves at small amplitude.

When the piston rod 20 moves to one side in the axial direction with respect to the inner cylinder 12 as indicated by white arrow in FIG. 3, the oil in the third oil chamber Y3 is pushed by the movement of the second piston 41, the pressure on the third oil chamber Y3 side of the second piston valve 40 rises, and high pressure acts on the second oil paths 412 of the second piston 41. As a result, the compression side valve 43, which closes the second oil paths 412, is opened and the oil flows into the first oil chamber Y1 on the other side of the second piston valve 40 through the second oil paths 412 as indicated by a thick arrow in FIG. 3. The flow of the oil from the third oil chamber Y3 to the first oil chamber Y1 is narrowed in the compression side valve 43 and the second oil paths 412 and acts as damping force during the compression stroke of the hydraulic pressure damping device 1.

The pressure in the first oil chamber Y1 is about to rise with the oil flowing in from the third oil chamber Y3. However, the pressure in the first oil chamber Y1 is absorbed by the control ring 35 moving to the second oil chamber Y2 side with respect to the first piston 31 in the ring moving and holding section 36. That is, the control ring 35 moves with respect to the first piston 31, whereby the capacity of the first oil chamber Y1 expands and a volume for the oil flowing into the first oil chamber Y1 is secured. Then, when the control ring 35 moves in the ring moving and holding section 36, a state in which the oil substantially flows from the first oil chamber Y1 to the second oil chamber Y2 is formed. Therefore, in a state in which the control ring 35 is moving, there is almost no difference between the pressures in the first oil chamber Y1 and the second oil chamber Y2. Therefore, a flow of the oil via the second oil paths 312 of the first piston valve 30 does not occur and damping force is hardly generated by the first piston valve 30.

On the other hand, in the bottom valve 60, when the piston rod 20 moves, as shown in FIG. 1, the pressure in the third oil chamber Y3 increased by the movement of the second piston 41 in one end side in the axial direction acts on the first oil paths 661 of the bottom valve 60 and opens the first valve 621, which closes the first oil paths 661. The oil in the first oil chamber Y1 flows into the reservoir chamber R formed between the inner cylinder 12 and the outer cylinder 11 through the first oil paths 661 and a recess 64a of the valve body 61. The flow of the oil from the third oil chamber Y3 to the reservoir chamber R is narrowed in the first valve 621 and the first oil paths 661. As a result, damping force is generated.

As explained above, during the compression stroke in which the piston rod 20 moves at small amplitude, main damping force is generated in the second piston valve 40 and the bottom valve 60.

Figure 4:
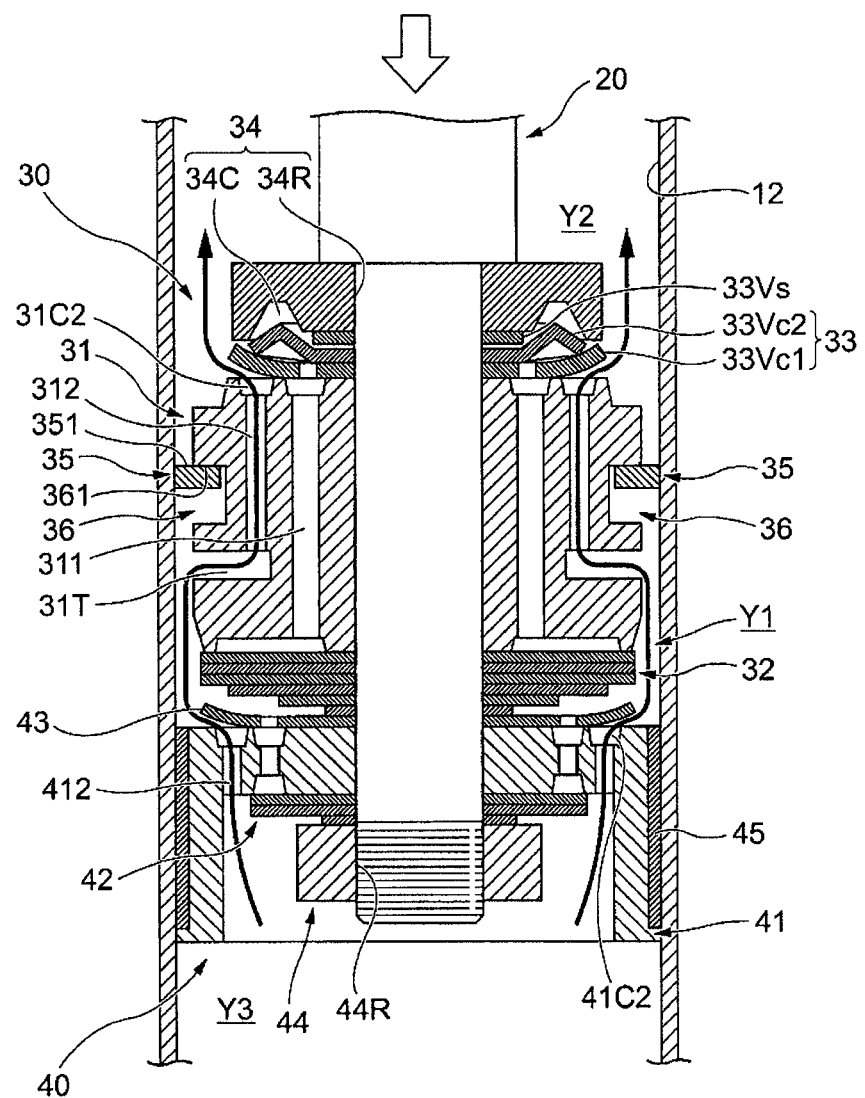
FIG. 4 is a diagram showing a flow of the oil during the compression stroke in the case of movement at large amplitude.

FIG. 4 is a diagram showing a flow of the oil in the compression stroke in which the piston rod 20 moves at large amplitude.

After the movement of the piston rod 20 reaches a range of large amplitude and, as shown in FIG. 4, the control ring 35 moves in the ring moving and holding section 36, the first end face 351 comes into contact with the first receiving section 361. Then, the movement (the position) of the control ring 35 with respect to the first piston 31 is fixed and a change in the capacity of the first oil chamber Y1 is limited. That is, absorption of the pressure of the oil in the first oil chamber Y1 is not performed. Then, the pressure on the first oil chamber Y1 side of the first piston valve 30 rises and high pressure acts on the second oil paths 312 of the first piston valve 30.

As a result, the first valve 33Vc1 of the compression side valve group 33, which closes the second oil paths 312, opens. The oil flows into the second oil chamber Y2 on the other side of the first piston valve 30 through the second oil paths 312 as indicated by a thick arrow in FIG. 4. The flow of the oil from the first oil chamber Y1 to the second oil chamber Y2 is narrowed in the compression side valve group 33 and the second oil paths 312 and acts as damping force during the compression stroke of the hydraulic pressure damping device 1.

Further, after the first end face 351 of the control ring 35 comes into contact with the first receiving section 361 of the ring moving and holding section 36, friction force generated between the control ring 35 and the inner cylinder 12 is applied to the first piston 31. The friction force acts in a direction for preventing movement of the piston rod 20. Therefore, the friction force acts as damping force during the compression stroke in the case of large amplitude.

As explained above, during the compression stroke in which the piston rod 20 moves at large amplitude, the damping force is generated in the second piston valve 40 and the bottom valve 60 in addition to the first piston valve 30. Therefore, when the piston rod 20 moves at large amplitude, large damping force is obtained compared with a state in which damping force is mainly generated in the second piston valve 40 and the bottom valve 60 when the piston rod 20 moves at small amplitude.

Subsequently, the operation during an extension stroke is explained.

Figure 5:
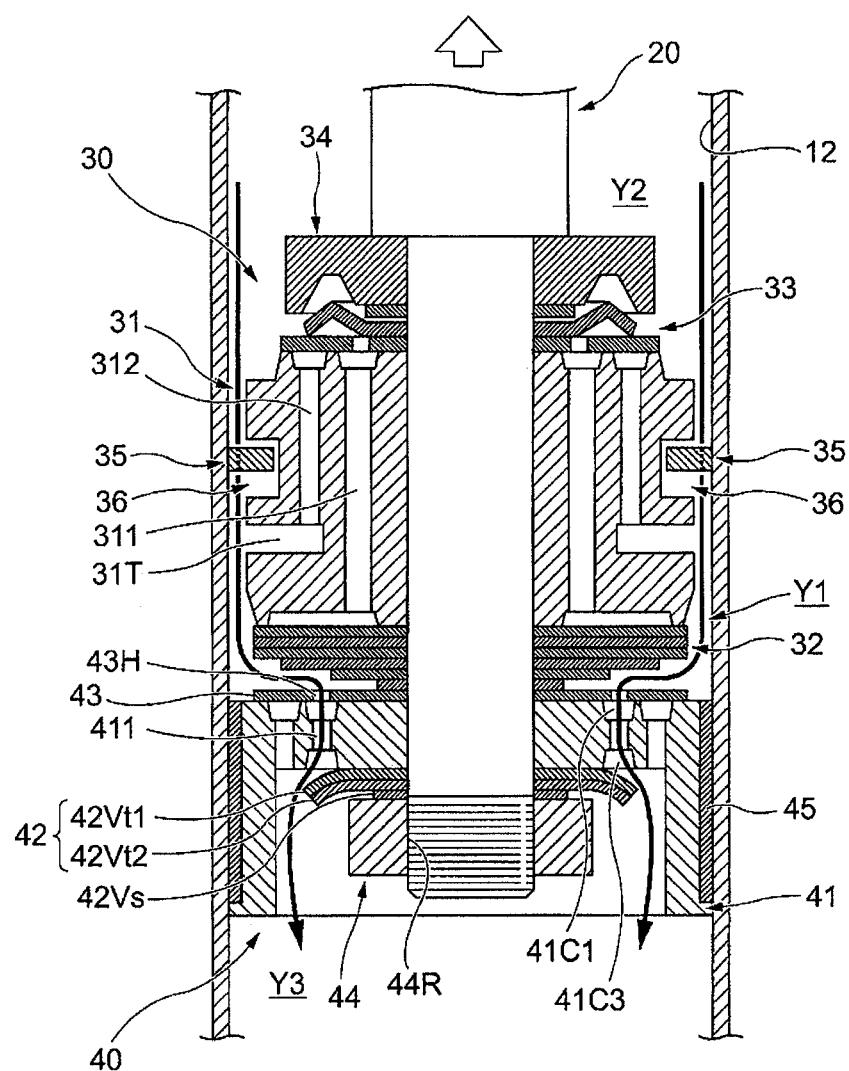
FIG. 5 is a diagram showing a flow of the oil during an extension stroke in the case of movement at small amplitude.

FIG. 5 is a diagram showing a flow of the oil during the extension stroke in which the piston rod 20 moves at small amplitude.

When the piston rod 20 moves in the other side in the axial direction with respect to the inner cylinder 12 as indicated by a white arrow in FIG. 5, the oil in the second oil chamber Y2 is pushed by the movement of the first piston 31 and the pressure on the second oil chamber Y2 side on the other side of the first piston valve 30 rises.

However, the pressure of the oil in the second oil chamber Y2 is absorbed by the control ring 35 moving toward the first oil chamber Y1 in the ring moving and holding section 36. That is, the control ring 35 moves with respect to the first piston 31, whereby the capacity of the second oil chamber Y2 expands and a rise of the oil in the second oil chamber Y2 is suppressed. Then, when the control ring 35 moves in the ring moving and holding section 36, a state in which the oil substantially flows from the second oil chamber Y2 to the first oil chamber Y1 is formed. Therefore, in a state in which the control ring 35 is moving, there is almost no difference between the pressures in the second oil chamber Y2 and the first oil chamber Y1. Therefore, a flow of the oil via the first oil paths 311 of the first piston valve 30 does not occur. Damping force is hardly generated by the first piston valve 30.

On the other hand, when the oil flows into the first oil chamber Y1 from the second oil chamber Y2, the pressure in the first oil chamber Y1 rises. According to the movement of the oil to the other side of the piston rod 20, the oil equivalent to a volume of the movement is short in the third oil chamber Y3, whereby the pressure in the third oil chamber Y3 falls with respect to the first oil chamber Y1. Consequently, high pressure acts on the first oil paths 411 and the extension side valve group 42, which closes the first oil paths 411, opens. Then, the oil flows into the third oil chamber Y3 on one side of the second piston valve 40 through the first oil paths 411 as indicated by a thick arrow in FIG. 5. The flow of the oil from the first oil chamber Y1 to the third oil chamber Y3 is narrowed in the extension side valve group 42 and the first oil paths 411 and acts as damping force during the compression stroke of the hydraulic pressure damping device 1.

Further, in the bottom valve 60, when the piston rod 20 moves, as shown in FIG. 1, the oil in the reservoir chamber R passes through the recess 64$a$ and the second oil paths 662 of the valve body 61 of the bottom valve 60, opens the second valve 622, which closes the second oil paths 662, and flows into the first oil chamber Y1. The flow of the oil from the reservoir chamber R to the third oil chamber Y3 is narrowed in the second valve 622 and the second oil paths 662 of the bottom valve 60. As a result, damping force is generated.

As explained above, during the expansion stroke in which the piston rod 20 moves at small amplitude, main damping force is generated in the second piston valve 40 and the bottom valve 60.

Figure 6:
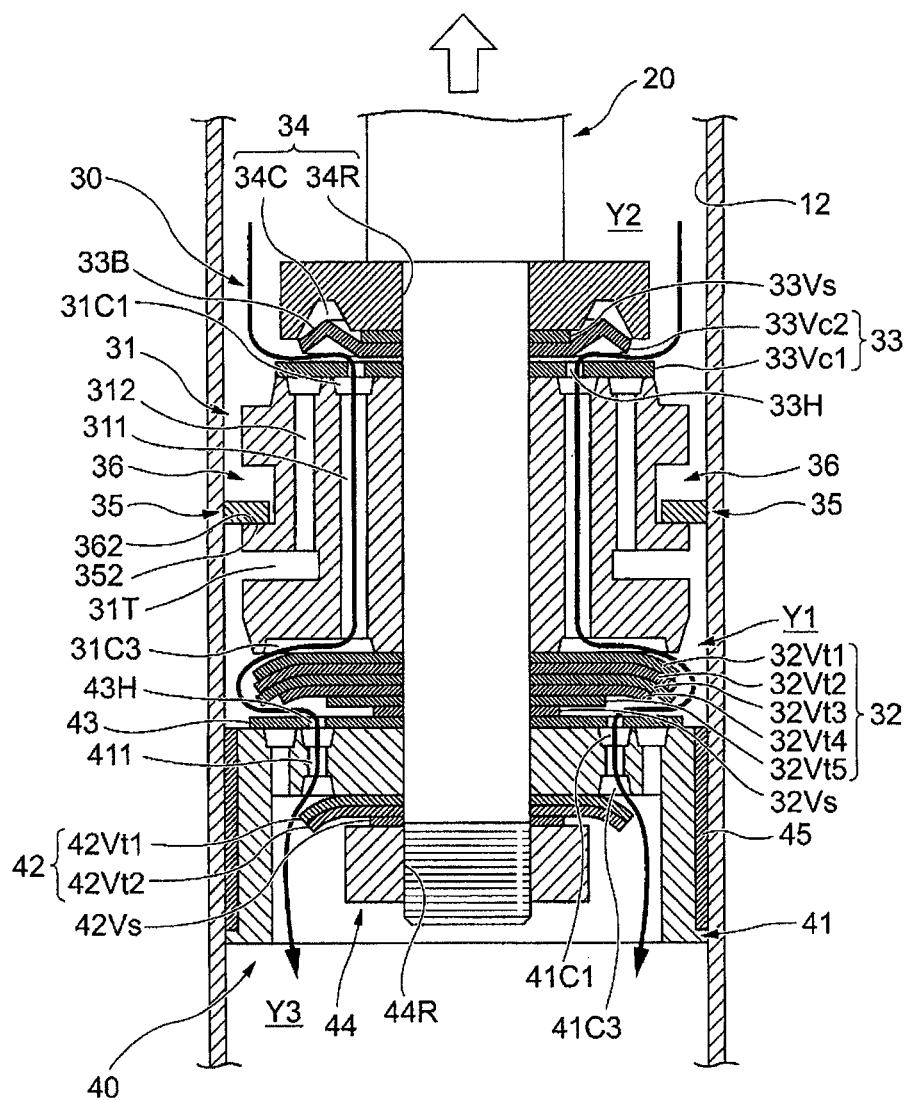
FIG. 6 is a diagram showing a flow of the oil during the extension stroke in the case of movement at large amplitude.

FIG. 6 is a diagram showing a flow of the oil during the expansion stroke in which the piston rod 20 moves at large amplitude.

After the movement of the piston rod 20 reaches the range of large amplitude and, as shown in FIG. 6, the control ring 35 moves in the ring moving and holding section 36, the second end face 352 comes into contact with the second receiving section 362. Then, the movement (the position) of the control ring 35 with respect to the first piston 31 is fixed and a change in the capacity of the second oil chamber Y2 is limited. That is, absorption of the pressure of the oil in the second oil chamber Y2 is not performed. Then, the pressure on the second oil chamber Y2 side of the first piston valve 30 rises and the pressure in the second oil chamber Y2 rises to be higher than the pressure in the first oil chamber Y1.

At this point, first, the second valve 33Vc2 of the compression side valve group 33 moves to the valve stopper 34 side and an inflow section of the oil on the second oil chamber Y2 side of the second oil paths 312 is opened. Then, the oil in the second oil chamber Y2 flows into the first oil paths 311 and the pressure of the oil in the first oil paths 311 rises. Therefore, the extension side valve group 32, which closes the first oil paths 311, opens.

As a result, the oil flows into the first oil chamber Y1 on one side of the first piston valve 30 through the first oil paths 311 as indicated by a thick arrow in FIG. 6. The flow of the oil from the second oil chamber Y2 to the first oil chamber Y1 is narrowed in the extension side valve group 32 and the first oil paths 311. Damping force during the extension stroke of the hydraulic pressure damping device 1 is obtained.

Further, after the second end face 352 of the control ring 35 comes into contact with the second receiving section 362 of the ring moving and holding section 36, friction force generated between the control ring 35 and the inner cylinder 12 is applied to the first piston 31. The friction force acts in a direction for preventing the movement of the piston rod 20. Therefore, the friction force acts as damping force during the expansion stroke in the case of large amplitude.

As explained above, when the piston rod 20 moves at large amplitude, the damping force is generated in the second piston valve 40 and the bottom valve 60 in addition to the first piston valve 30. Therefore, when the piston rod 20 moves at large amplitude, larger damping force is generated compared with a state in which damping force is mainly generated in the second piston valve 40 and the bottom valve 60 when the piston rod 20 moves at small amplitude.

Figure 7A:
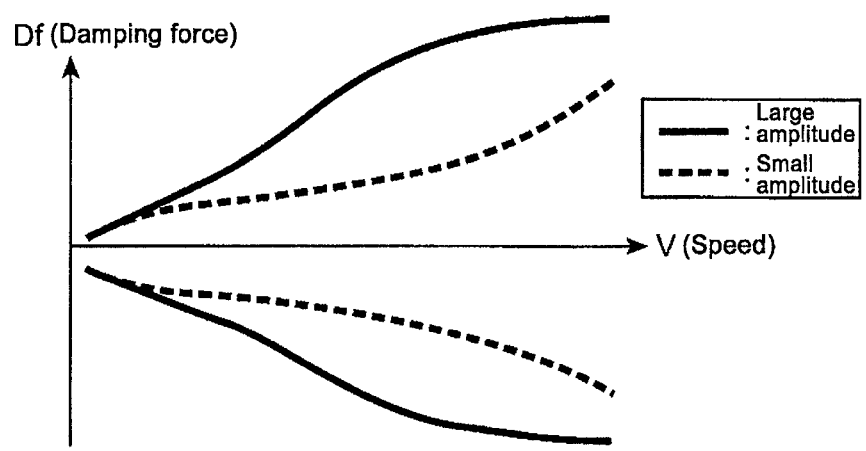
FIGS. 7A and 7B are diagrams for explaining damping force generated in the hydraulic pressure damping device according to the embodiment.
Figure 7B:
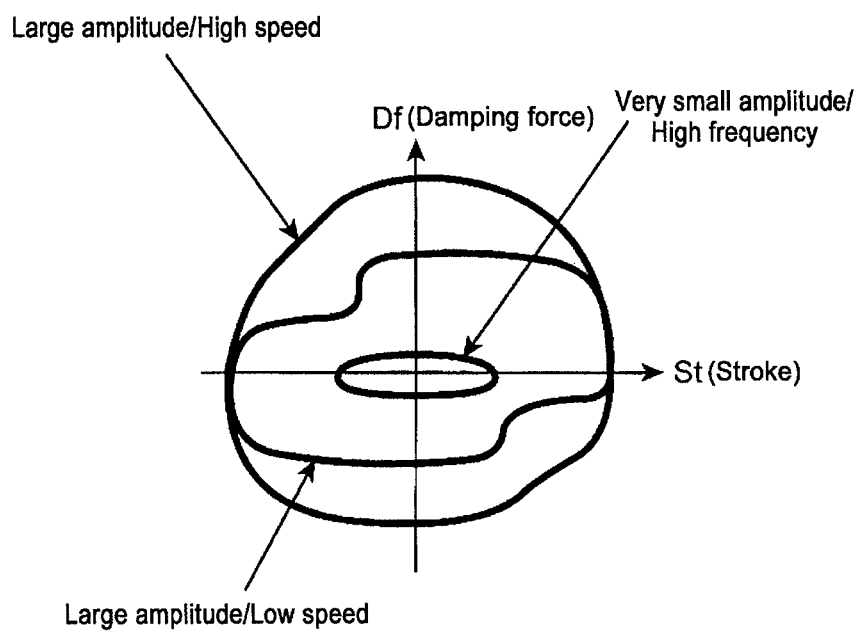

FIGS. 7A and 7B are diagrams for explaining damping force generated in the hydraulic pressure damping device 1 according to this embodiment. FIG. 7A is a diagram showing a damping force characteristic. The abscissa indicates moving speed of the piston rod 20 and the ordinate indicates damping force. FIG. 7B is a diagram showing a Lissajous waveform corresponding to amplitude and a frequency. The abscissa indicates a stroke amount of the piston rod 20 and the ordinate indicates damping force.

First, as shown in FIG. 7A, it is seen that the damping force during small amplitude is low compared with the damping force during large amplitude. During large amplitude, the damping force gradually increases according to an increase in the moving speed of the piston rod 20. On the other hand, it is seen that, during small amplitude, even if the moving speed increases, a state in which the damping force is low is generally maintained until the moving speed reaches fixed speed.

As shown in FIG. 7B, it is seen that the damping force is small during very small amplitude and a high frequency (high speed). This is because the control ring 35 changes to a state in which the control ring 35 moves in the ring moving and holding section 36 as explained above during the very small amplitude and generated damping force is relatively small.

It is seen that, during large amplitude and low speed, although the control ring 35 moves and damping force is relatively small up to a fixed stroke, the damping force increases when the control ring 35 changes to a state in which the control ring 35 cannot move because a stroke exceeds a fixed amount.

Further, it is seen that, during large amplitude and high speed, since, immediately after the piston rod 20 starts a moving action, the control ring 35 shifts to a state in which the control ring 35 cannot move, relatively high damping force is immediately generated and, thereafter, high damping force is maintained.

As explained above, in the hydraulic pressure damping device 1 applied with this embodiment, it is possible to improve riding comfort by reducing damping force in a state in which a vehicle is traveling on, for example, a fine road with small roughness where amplitude is very small and a frequency is high. In the hydraulic pressure damping device 1 applied with this embodiment, it is possible to improve steering stability by increasing damping force in a state in which the vehicle is traveling on, for example, a bad road with large roughness where amplitude is large.

Further, the hydraulic pressure damping device 1 applied with this embodiment realizes, with a relatively simple structure, using the control ring 35 provided around the first piston 31 in the first piston valve 30, formation of a state in which high damping force is generated according to amplitude and a state in which low damping force is generated. Therefore, it is possible to reduce manufacturing variation of the hydraulic pressure damping device 1 and attain a reduction in costs.

In this embodiment, by providing the second piston valve 40 and the bottom valve 60 as an example of the "second piston", a state in which damping force is mainly generated only in the first piston valve 30 and a state in which damping force is generated in the first piston valve 30, the second piston valve 40, and the bottom valve 60 are controlled according to the position of the control ring 35. However, the hydraulic pressure damping device 1 is not limited to this configuration.

That is, in a configuration including only the first piston valve 30 including the control ring 35 in the hydraulic pressure damping device 1 according to this embodiment, it is also possible to change damping force according to amplitude. In this case, in a state in which the control ring 35 is moving, a state in which damping force is not generated in the first piston valve 30 and damping force is low is formed. On the other hand, damping force is generated in the first piston valve 30 in a state in which the movement of the control ring 35 stops. Further, friction force in the control ring 35 is caused to act as damping force. Consequently, it is possible to form a state in which high damping force is generated.

In the embodiment explained above, the annular control ring 35 is provided in the recess formed in the circumferential direction on the side of the first piston 31. However, the hydraulic pressure damping device 1 is not limited to this.

For example, a projection is formed in the circumferential direction on the side of the first piston 31. On the other hand, a recess is formed in the circumferential direction in the inner circumference of the opening section 35H of the control ring 35. The projection of the first piston 31 is attached to the recess in the inner circumference of the control ring 35 to be movable in the axial direction. In a hydraulic force damping device including such a configuration, damping force may be changed according to a positional relation of the control ring 35 with respect to the first piston 31.

[Modification 1]

Subsequently, the hydraulic pressure damping device 1 in a modification 1 is explained.

Figure 8:
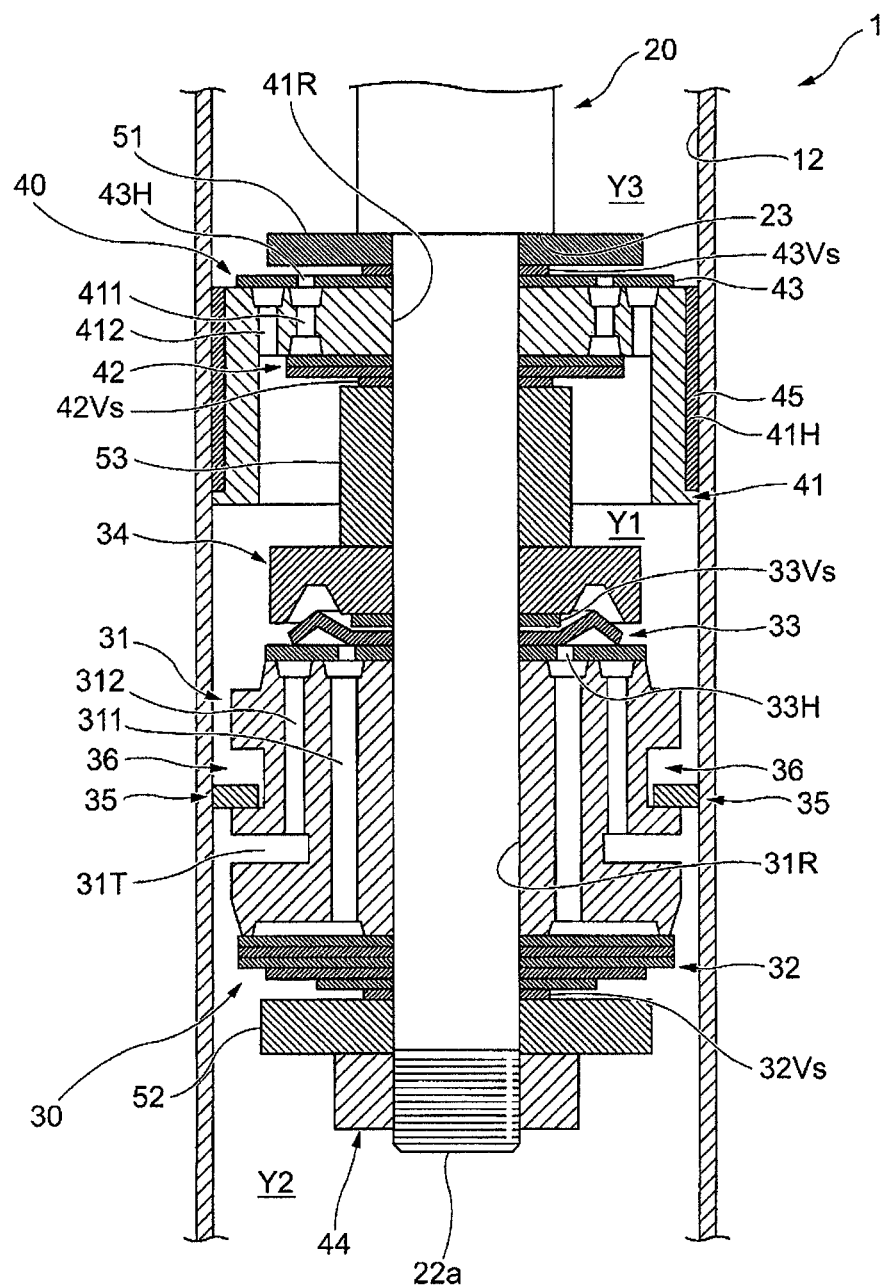
FIG. 8 is a diagram for explaining a hydraulic pressure damping device in a modification 1 in detail.

FIG. 8 is a diagram for explaining the hydraulic pressure damping device 1 in the modification 1 in detail.

The hydraulic pressure damping device 1 in the modification 1 is the same as the hydraulic pressure damping device 1 according to the embodiment in a basic configuration. In the following explanation, components different from the components of the hydraulic pressure damping device 1 according to the embodiment are mainly explained. Components same as the components of the hydraulic pressure damping device 1 according to the embodiment are denoted by the same reference numerals and signs and detailed explanation of the components is omitted.

As shown in FIG. 8, the hydraulic pressure damping device 1 in the modification 1 includes the piston rod 20, the first piston valve 30, the second piston valve 40, a first valve stopper 51, a second valve stopper 52, and a collar member 53.

The first valve stopper 51 is attached to the step section 23 of the piston rod 20. The second piston valve 40 is attached to the piston rod 20 to hold the first valve stopper 51 between the second piston valve 40 and the step section 23. The third oil chamber Y3 is formed on the other side by the friction member 45 of the second piston valve 40.

In the hydraulic pressure damping device 1 in the modification 1, a valve seat 43Vs is provided between the compression side valve 43 and the first valve stopper 51. The valve seat 43Vs function as a fulcrum of a bend when the compression side valve 43 is deformed.

The collar member 53 is attached to the extension side valve group 42 side of the second piston valve 40. The valve seat 42Vs is provided between the extension side valve group 42 and the collar member 53. The valve seat 42Vs functions as a fulcrum of a bend when the extension side valve group 42 is deformed.

Since the collar member 53 is located between the second piston valve 40 and the first piston valve 30, a space into which the oil flows is formed between the second piston valve 40 and the first piston valve 30. In the hydraulic pressure damping device 1 in the modification 1, the space formed between the second piston valve 40 and the first piston valve 30 configures the first oil chamber Y1.

The second valve stopper 52 is arranged on the extension side valve group 32 side of the first piston valve 30. The nut 44 is attached via the second valve stopper 52, whereby the first piston valve 30 is held in the piston rod 20. The first piston valve 30 forms the second oil chamber Y2 on one side with the control ring 35 movably provided in the outer circumference of the first piston 31.

As explained above, in the hydraulic pressure damping device 1 in the modification 1, compared with the hydraulic pressure damping device 1 according to the embodiment, a positional relation between the first piston valve 30 and the second piston valve 40 is opposite in the axial direction. In the hydraulic pressure damping device 1 configured in this way, it is also possible to form, with the control ring 35 provided in the first piston valve 30, a state in which a damping force mainly damped by only the second piston valve 40 is low and a state in which damping force damped by the second piston valve 40 and the first piston valve 30 is high.

[Modification 2]

Subsequently, the hydraulic pressure damping device 1 in a modification 2 is explained.

Figure 9A:
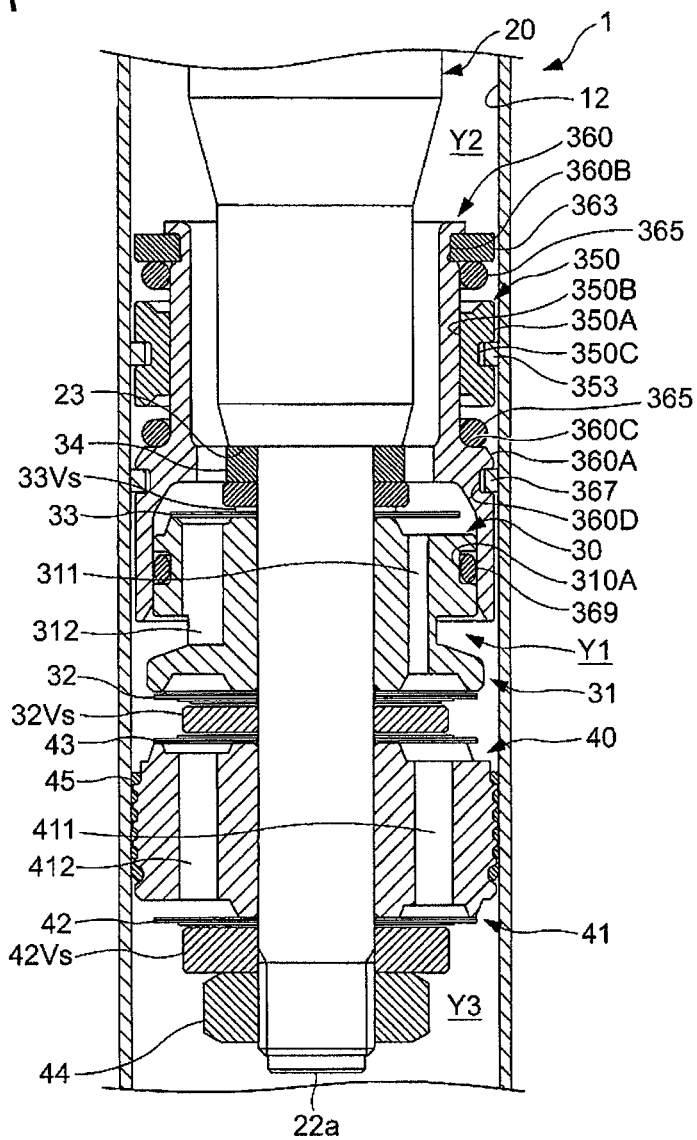
FIGS. 9A and 9B are diagrams for explaining a hydraulic pressure damping device in a modification 2 in detail.
Figure 9B:
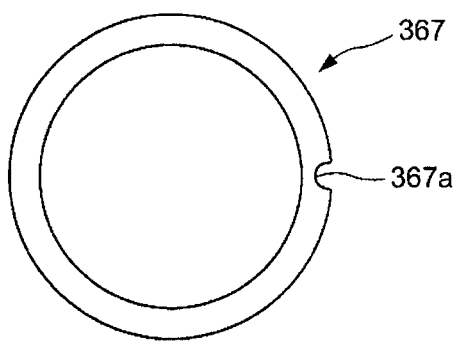

FIGS. 9A and 9B are diagrams for explaining the hydraulic pressure damping device 1 in the modification 2. FIG. 9A is a diagram showing an overall configuration of the hydraulic pressure damping device 1 in the modification 2. FIG. 9B is a diagram showing the configuration of a case ring 367.

The hydraulic pressure damping device 1 in the modification 2 is the same as the hydraulic pressure damping device 1 according to the embodiment in a basic configuration. In the following explanation, components different from the components of the hydraulic pressure damping device 1 according to the embodiment are mainly explained. Components same as the components of the hydraulic pressure damping device 1 according to the embodiment are denoted by the same reference numerals and signs and detailed explanation of the components is omitted.

As shown in FIG. 9A, the hydraulic pressure damping device 1 in the modification 2 includes the piston rod 20, the first piston valve 30, and the second piston valve 40. The first piston valve 30 includes a free piston 350 and a cylindrical section 360.

The free piston 350 as an example of the moving and partitioning member is not fixed to the first piston valve 30 and is movable in the axial direction. On the other hand, the cylindrical section 360 inserted into and provided on the inner side of the free piston 350 is fixed to the first piston valve 30.

The free piston 350 has a function corresponding to the control ring 35 (see FIG. 2) in the embodiment and is configured to be movable with respect to the first piston 31. As explained in detail below, the free piston 350 is provided in a position different from the first piston 31 (or the second piston 41) in the axial direction.

The free piston 350 includes a piston main body 350A, which is a ring-like (annular) member including an opening section 350B on the inside, and a seal material 353, which is a ring-like member provided on the outer side of the piston main body 350A.

The free piston 350 includes, on the outer side of the piston main body 350A, a groove section 350C formed in the circumferential direction. The seal material 353 is arranged in the groove section 350C.

The inner diameter of the piston main body 350A is set larger than the outer diameter of the cylindrical section 360. The outer diameter of the piston main body 350A is set small with respect to the inner diameter of the inner cylinder 12. Consequently, the free piston 350 is configured to be movable in the axial direction of the inner cylinder 12.

The seal material 353 provided on the outer side of the piston main body 350A is formed in a dimension for setting the outer circumferential side thereof in contact with the inner circumferential surface of the inner cylinder 12. Consequently, the seal material 353 seals a gap formed between the outer circumferential surface of the piston main body 350A and the inner circumferential surface of the inner cylinder 12 and suppresses the oil from flowing in the gap.

The cylindrical section 360 includes a cylinder main body 360A, which is a substantially cylindrical member, and a holding ring 363, O rings 365, and a case ring 367, each provided in the outer circumference of the cylinder main body 360A.

The cylinder main body 360A has an inner diameter for enabling the one side attachment section 22a of the piston rod 20 to pierce through the cylinder main body 360A. In the example shown in the figure, one end in the axial direction is formed to have an external diameter larger than the external diameter of the other end in the axial direction. Further, the one end has an inner diameter for enabling the first piston 31 to be housed in the one end. The other end has an external diameter for enabling the other end to pierce through the inside of the free piston 350.

The cylinder main body 360A includes a first recess 360B formed in the circumferential direction on the other end side, a step section 360C formed further on the one end side than the first recess 360B and formed in a small outer diameter compared with the one end, and a second recess 360D formed further on the one end side than the step section 360C and in the circumferential direction.

The holding ring 363 is a ring-like (annular) member and is provided in the first recess 360B of the cylinder main body 360A. The holding ring 363 suppresses the free piston 350 moving in the axial direction from coming off the cylinder main body 360A.

The O rings 365, which are an example of the damping material, are ring-like (annular) members respectively provided, in the axial direction, between the holding ring 363 and the free piston 350 and between the free piston 350 and the step section 360C. The O rings 365 suppress collision noise that occurs when the free piston 350 moving in the axial direction collides with the holding ring 363 or the step section 360C. Unlike the example shown in the figure, the O ring 365 may be provided between the holding ring 363 and the free piston 350 or between the free piston 350 and the step section 360C.

The case ring 367, which is an example of the limiting member, is a ring-like (annular) member and is provided in the second recess 360D of the cylinder main body 360A. The case ring 367 limits a flow of the oil in the axial direction between the outer circumferential surface of the cylinder main body 360A and the inner circumferential surface of the inner cylinder 12.

As shown in FIG. 9B, in the case ring 367, a cutout (a diaphragm) 367a formed by cutting out a part in the circumferential direction is provided. Since the case ring 367 includes the cutout 367a, compared with the case ring 367 not including the cutout 367a, even when the frequency (speed) of the piston rod 20 increases, damping force is generated earlier. In other words, damping force is started up quickly.

Referring back to FIG. 9A, the case ring 367 in the example shown in the figure is provided further on one end side (in FIG. 9A, the lower side) than the free piston 350. However, the case ring 367 may be provided further on the other end side (in FIG. 9A, the upper side) than the free piston 350. The cutout 367a in the example shown in the figure is provided in one place in the circumferential direction of the free piston 350. However, the cutout 367a may be provided in a plurality of places. The cutout 367a may be formed by a C-shape ring.

In the outer circumference of the first piston 31 in the hydraulic pressure damping device 1 in the modification 2, a third recess 310A formed in the circumferential direction is formed and a seal material 369 is provided in the third recess 310A. The seal material 369 comes into contact with the inner circumference of the cylinder main body 360A on one end side of the cylinder main body 360A and limits a flow of the oil between the outer circumference of the first piston 31 and the inner circumference of the cylinder main body 360A.

The third oil chamber Y3 is formed further on one side in the axial direction than the friction member 45 of the second piston valve 40. The first oil chamber Y1 is formed between further on the other side in the axial direction than the friction member 45 of the second piston valve 40 and further on one side in the axial direction than the free piston 350 of the first piston valve 30. The second oil chamber Y2 is formed further on the other side in the axial direction than the free piston 350 of the first piston valve 30.

In the hydraulic pressure damping device 1 in the modification 2, the free piston 350 is provided in a position different from the first piston 31 (or the second piston 41) in the axial direction. More specifically, the free piston 350 is provided further on the other side in the axial direction than the first piston 31. The free piston 350 may be provided between the first piston 31 and the second piston 41 or further on one side in the axial direction than the second piston 41 as long as the free piston 350 is provided in a position different from the first piston 31 and the second piston 41 in the axial direction.

Since the free piston 350 is provided in the position different from the first piston 31 in the axial direction, it is possible to provide the free piston 350 without being limited by the dimensions of the first piston 31 and the inner cylinder 12. Further, for example, even when a gap between the outer circumferential surface of the first piston 31 and the inner circumferential surface of the inner cylinder 12 is small, the free piston 350 can be provided. A distance in which the free piston 350 can move can be set larger than the axial direction length of the first piston 31.

In the example shown in the figure, the distance in which the free piston 350 can move with respect to the cylindrical section 360 corresponds to the distance in the axial direction between the O rings 365 respectively provided on the holding ring 363 side and the step section 360C side. For example, the distance in the axial direction between the O rings 365 is set to be about 1.2 to two times as large as the axial direction length of the piston main body 350A of the free piston 350.

The piston main body 350A can absorb vibration by an amount of movement of the free piston 350.

In the free piston 350 in the example shown in the figure, since the seal material 353 is provided on the outer side of the piston main body 350A, the oil is suppressed from flowing between the outer circumferential surface of the piston main body 350A and the inner circumferential surface of the inner cylinder 12. Therefore, the movement of the oil between the first oil chamber Y1 and the third oil chamber Y3 that occurs according to the movement of the piston rod 20 is performed via the first piston valve 30 or the second piston valve 40. Consequently, damping force is generated by the first piston valve 30 or the second piston valve 40 and so-called staggering is suppressed.

The operation of the hydraulic pressure damping device 1 configured as explained above is explained.

First, the operation during the compression stroke is explained.

Figures 10A, 10B:
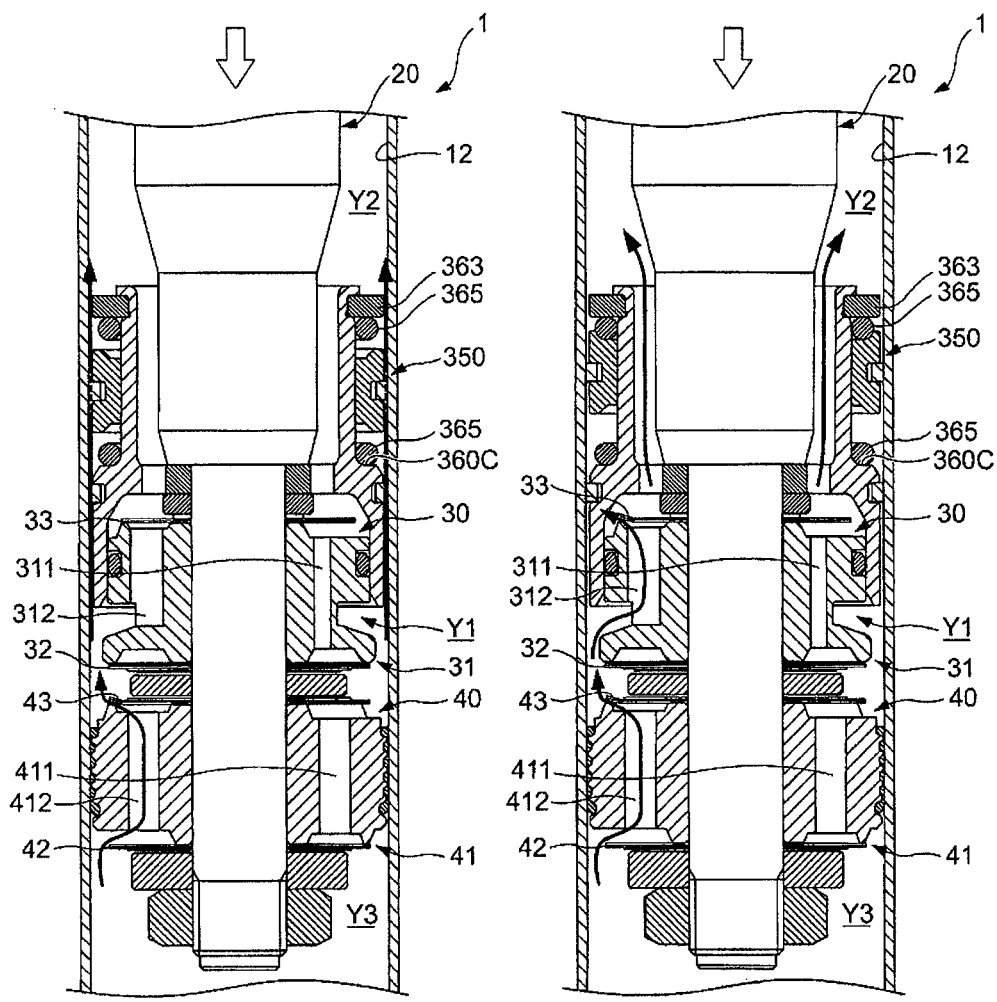
FIGS. 10A and 10B are diagrams showing a flow of oil during a compression stroke in the modification 2.

FIGS. 10A and 10B are diagrams showing a flow of the oil during the compression stroke in the modification 2. More specifically, FIG. 10A is a diagram showing a flow of the oil during the compression stroke in the case of movement at small amplitude. FIG. 10B is a diagram showing a flow of the oil during the compression stroke in the case of movement at large amplitude.

First, the operation during the compression stroke in which the piston rod 20 moves at small amplitude is explained.

As shown in FIG. 10A, when the piston rod 20 moves to one side in the axial direction with respect to the inner cylinder 12 as indicated by a white arrow in the figure, the pressure on the third oil chamber Y3 side rises, the compression side valve 43, which closes the second oil paths 412, opens, and the oil flows into the first oil chamber Y1 through the second oil paths 412 as indicated by a thick arrow in the figure.

The pressure in the first oil chamber Y1 is about to rise with the oil flowing in from the third oil chamber Y3. However, the pressure in the first oil chamber Y1 is absorbed by the free piston 350 moving toward the second oil chamber Y2 side (the holding ring 363 side). Consequently, a flow of the oil via the second oil paths 312 of the first piston valve 30 does not occur.

The operation during the compression stroke in which the piston rod 20 moves at large amplitude is explained.

As shown in FIG. 10B, after the movement of the piston rod 20 reaches the range of large amplitude and the free piston 350 moves toward the second oil chamber Y2 side with respect to the first piston 31, the free piston 350 reaches the O ring 365 on the holding ring 363 side. Then, the movement (the position) of the free piston 350 with respect to the first piston 31 is fixed and absorption of the pressure of the oil in the first oil chamber Y1 is not performed.

When the pressure on the first oil chamber Y1 side of the first piston valve 30 rises, the compression side valve group 33, which closes the second oil paths 312, opens. The oil flows into the second oil chamber Y2 through the second oil paths 312 as indicated by a thick arrow in the figure.

Consequently, as in the hydraulic pressure damping device 1 in the embodiment, when the piston rod 20 moves at large amplitude, larger damping force is obtained compared with damping force obtained when the piston rod 20 moves at small amplitude.

The operation during the extension stroke is explained.

Figures 11A, 11B:
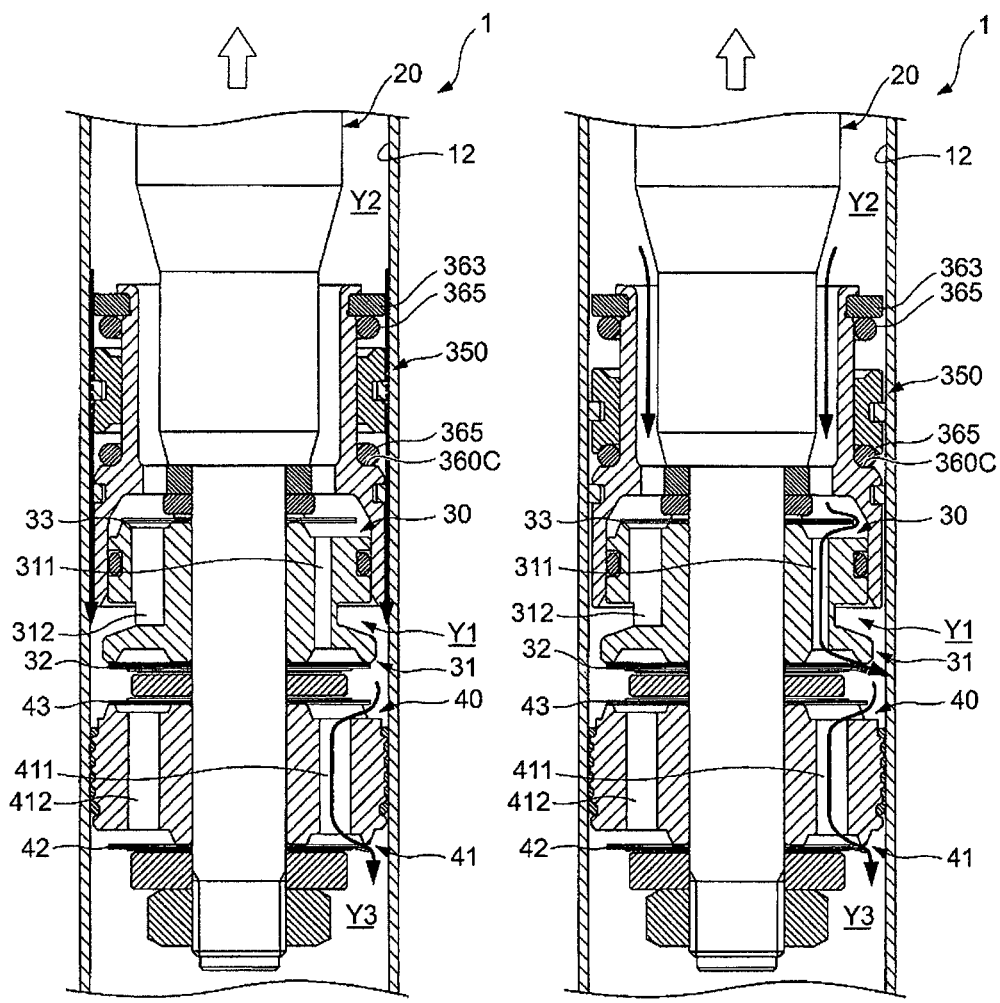
FIGS. 11A and 11B are diagrams showing a flow of the oil during an extension stroke in the modification 2.

FIGS. 11A and 11B are diagrams showing a flow of the oil during the extension stroke in the modification 2. FIG. 11A is a diagram showing a flow of the oil during the extension stroke in the case of movement at small amplitude. FIG. 11B is a diagram showing a flow of the oil during the extension stroke in the case of movement at larger amplitude.

First, the operation of the extension stroke in which the piston rod 20 moves at small amplitude is explained.

As shown in FIG. 11A, when the piston rod 20 moves to the other side in the axial direction with respect to the inner cylinder 12 as indicated by a white arrow in the figure, the pressure on the second oil chamber Y2 rises. The pressure of the oil in the second oil chamber Y2 is absorbed by the free piston 350 moving toward the first oil chamber Y1 side (the step section 360C side). Consequently, a flow of the oil via the first oil paths 311 of the first piston valve 30 does not occur.

On the other hand, when the pressure in the first oil chamber Y1 rises according to the movement of the free piston 350, the pressure in the third oil chamber Y3 rises with respect to the first oil chamber Y1 according to the movement of the piston rod 20. Consequently, the extension side valve group 42, which closes the first oil paths 411, opens. The oil flows into the third oil chamber Y3 through the first oil paths 411 as indicated by a thick arrow in the figure.

The operation of the extension stroke in which the piston rod 20 moves at large amplitude is explained.

As shown in FIG. 11B, after the movement of the piston rod 20 reaches the range of large amplitude and the free piston 350 moves toward the second oil chamber Y2 side, the free piston 350 reaches the O ring 365 on the step section 360C side. Then, the movement (the position) of the free piston 350 with respect to the first piston 31 is fixed. Absorption of the pressure of the oil in the second oil chamber Y2 is not performed.

When the pressure on the second oil chamber Y2 side of the first piston valve 30 rises, the extension side valve group 32, which closes the first oil paths 311, opens. The oil flows into the first oil chamber Y1 through the first oil paths 311 as indicated by a thick arrow in the figure.

Consequently, as in the hydraulic pressure damping device 1 according to the embodiment, when the piston rod 20 moves at large amplitude, larger damping force is obtained compared with damping force obtained when the piston rod 20 moves at small amplitude.

[Modification 3 and Modification 4]

Subsequently, the hydraulic pressure damping device 1 in a modification 3 and a modification 4 is explained.

Figure 12:
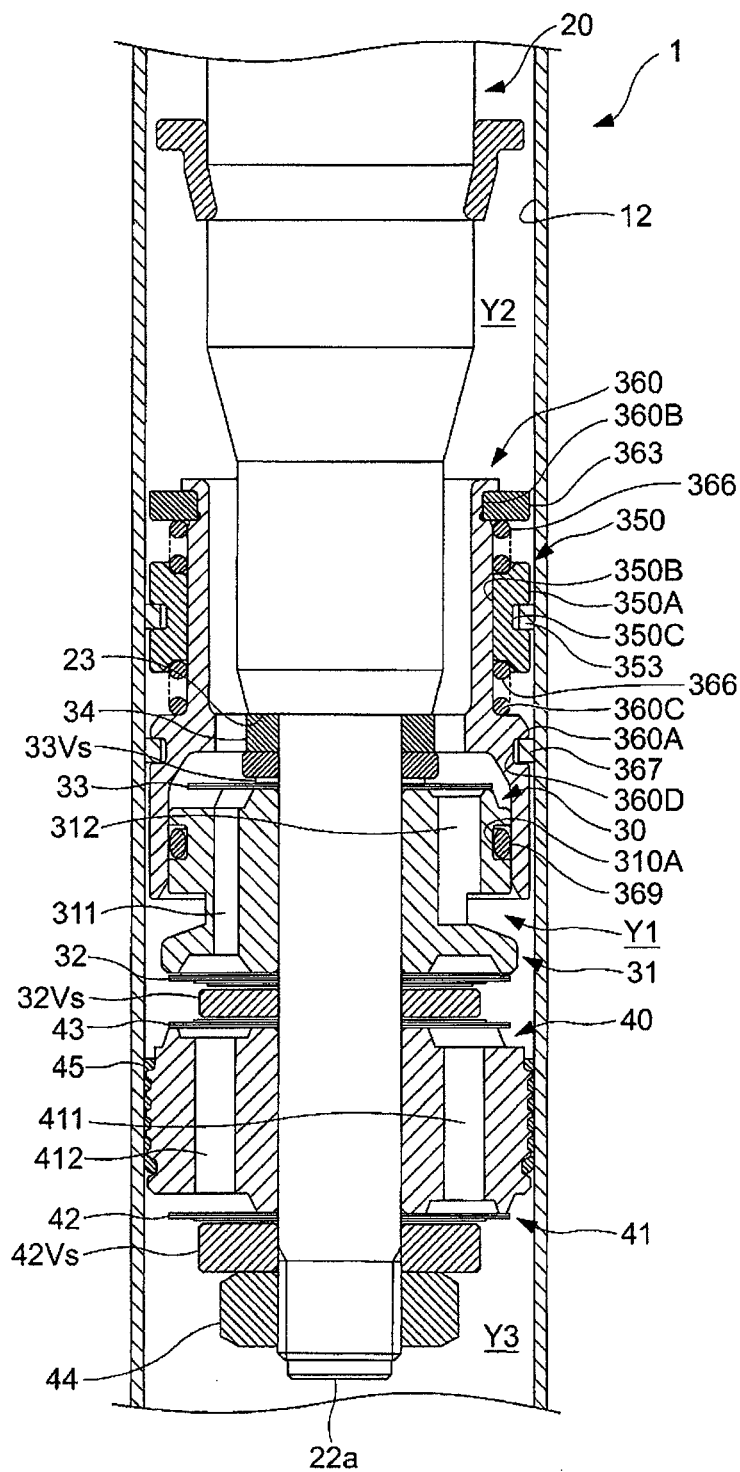
FIG. 12 is a diagram for explaining a hydraulic pressure damping device in a modification 3 in detail.

FIG. 12 is a diagram for explaining the hydraulic pressure damping device 1 in the modification 3 in detail.

Figure 13:
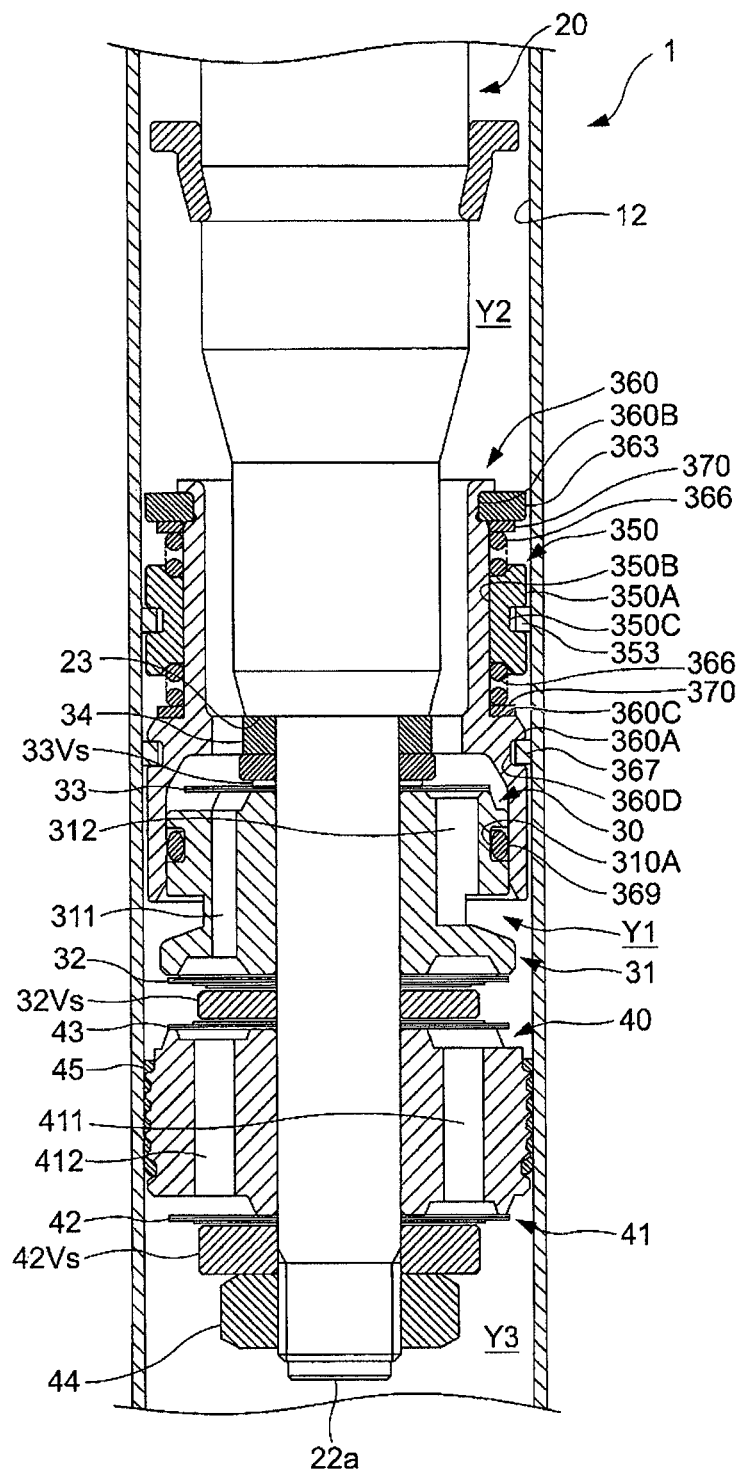
FIG. 13 is a diagram for explaining a hydraulic pressure damping device in a modification 4 in detail.

FIG. 13 is a diagram for explaining the hydraulic pressure damping device 1 in the modification 4 in detail.

The hydraulic pressure damping device 1 in the modification 3 and the modification 4 is the same as the hydraulic pressure damping device 1 according to the embodiment in a basic configuration. In the following explanation, components different from the components of the hydraulic pressure damping device 1 according to the embodiment are mainly explained. Components same as the components of the hydraulic pressure damping device 1 according to the embodiment are denoted by the same reference numerals and signs and detailed explanation of the components is omitted.

In the modification 2, the hydraulic pressure damping device 1 includes the O rings 365 in the positions at both the ends in the axial direction of the free piston 350. However, other configurations may be adopted as long as collision noise that occurs between the free piston 350 moving in the axial direction and the holding ring 363 or the step section 360C is suppressed.

For example, as shown in FIG. 12, the cylindrical section 360 in the modification 3 may include springs 366 respectively at both the ends in the axial direction of the free piston 350 to sandwich the free piston 350 in the axial direction. Alternatively, unlike the example shown in the figure, the spring 366 may be provided at one end in the axial direction of the free piston 350.

The springs (urging members) 366 in the example shown in the figure are respectively formed in coil shapes. One end in the axial direction of the spring 366 on the holding ring 363 side is opposed to the free piston 350. The other end in the axial direction of the spring 366 on the holding ring 363 side is opposed to the holding ring 363. One end in the axial direction of the spring 366 on the step section 360C side is opposed to the step section 360C. The other end in the axial direction of the spring 366 on the step section 360C side is opposed to the free piston 350.

The free piston 350 is sandwiched by the springs 366 in the axial direction, whereby restoring force for restoring the free piston 350 to a position set in advance in the axial direction is applied to the free piston 350.

Time from the time when the free piston 350 receives the pressure of the oil and starts movement until the movement is limited on the holding ring 363 side or the step section 360C side can be adjusted by changing a spring constant of the springs 366.

For example, as shown in FIG. 13, the cylindrical section 360 in the modification 4 may include the springs 366 respectively at both the ends in the axial direction of the free piston 350 to sandwich the free piston 350 in the axial direction. Further, the cylindrical section 360 in the modification 4 may include elastic members 370, which are ring-like (annular) members made of rubber or the like, between the holding ring 363 and one spring 366 and between the other spring 366 and the step section 360C.

Since the springs 366 and the elastic members 370 are arranged along the axial direction, collision noise that occurs when the free piston 350 moving in the axial direction collides with the holding ring 363 or the step section 360C is more surely suppressed.

As describe above, the detailed description of embodiments discloses the following.

[1] A pressure damping device includes: a cylinder configured to store liquid; a piston provided movably in the cylinder in an axial direction of the cylinder, and formed to have a plurality of channels for the liquid; a moving and partitioning member located between the piston and the cylinder, and provided movably from one end to the other end in the axial direction of a movable region provided in the piston, and configured to partition a space in the cylinder into a first liquid chamber and a second liquid chamber for storing the liquid; a first opening and closing member configured to open and close an opening in at least a part of the plurality of channels of the piston and open the opening when the moving and partitioning member is located at the one end of the movable region of the piston; and a second opening and closing member configured to open and close an opening in at least a part of the plurality of channels on the opposite side to a side of the plurality of channels of the piston opened and closed by the first opening and closing member and open the opening when the moving and partitioning member is located at the other end of the movable region of the piston.

[2] The pressure damping device according to [1], further includes: a second piston that is provided on the first liquid chamber side of the cylinder to form a third liquid chamber for storing the liquid in the space in the cylinder, and that has a plurality of channels for communicating the first liquid chamber and the third liquid chamber with each other, in which the pressure damping device causes the second piston to generate damping force in a state in which the moving and partitioning member is moving between the one end and the other end and causes the piston and the second piston to generate the damping force in a state in which the moving and partitioning member is located at the one end or the other end.

[3] A pressure damping device includes: a cylinder configured to store liquid; a piston provided movably in the cylinder in an axial direction of the cylinder, and formed to have a plurality of channels for the liquid; a moving and partitioning member provided movably in the axial direction on a side of the piston and configured to partition a space in the cylinder into a first liquid chamber and a second liquid chamber for storing the liquid; and a second piston provided on the first liquid chamber side of the cylinder to form a third liquid chamber for storing the liquid in the space in the cylinder, and having a plurality of channels for communicating the first liquid chamber and the third liquid chamber with each other.

[4] In the pressure damping device according to [3], the piston has a recess formed in a circumferential direction on a side of the piston, and the moving and partitioning member has an annular shape and is movably attached in the recess of the piston.

[5] In the pressure damping device according to [3] or [4], the moving and partitioning member moves with respect to the piston as a result of operation of the piston and changes capacities of the first liquid chamber and the second liquid chamber, and limits the change of the capacities of the first liquid chamber and the second liquid chamber when a position of the moving and portioning member with respect to the piston is fixed.

[6] A pressure damping device includes: a cylinder configured to store liquid; a piston provided movably in the cylinder in an axial direction of the cylinder, and formed to have a plurality of channels for the liquid; a moving and partitioning member provided in a position in the axial direction of the cylinder different from a position of the piston in the cylinder and movably from one end to the other end in the axial direction of a movable region extending along the axial direction of the cylinder, and configured to partition a space in the cylinder into a first liquid chamber and a second liquid chamber for storing the liquid; a first opening and closing member configured to open and close an opening in at least a part of the plurality of channels of the piston and open the opening when the moving and partitioning member is located at the one end of the movable region of the piston; and a second opening and closing member configured to open and close an opening in at least a part of the plurality of channels on the opposite side to a side of the plurality of channels of the piston opened and closed by the first opening and closing member and open the opening when the moving and partitioning member is located at the other end of the movable region of the piston.

[7] The pressure damping device according to [6], further includes: a limiting member that is an annular member provided in the cylinder and configured to limit a flow of the liquid flowing in the axial direction of the cylinder, in which the limiting member has a cutout formed in a part in a circumferential direction thereof.

[8] The pressure damping device according to [6], further includes: a damping material configured to reduce a bumping impact of the moving and partitioning member, in which the damping material is provided on at least one of the one end side and the other end side in the movable region of the moving and partitioning member.

[9] The pressure damping device according to any one of [6] to [8], further includes: an urging member provided to be opposed to an axial direction end of the cylinder in the moving and partitioning member and configured to urge the moving and partitioning member in the axial direction of the cylinder.

What is claimed is:

1. A pressure damping device comprising:
    a cylinder configured to store liquid;
    a first piston provided movably in the cylinder in an axial direction of the cylinder, and has at least a first channel, a second channel and a third channel through which the liquid flows;
    a moving and partitioning member located inside the cylinder, and provided movably from one end to another end in the axial direction of a movable region formed inside the cylinder and defined between a first surface and a second surface, and configured to be capable of partitioning a space in the cylinder into a first liquid chamber and a second liquid chamber for storing the liquid;
    a first opening and closing member configured to open and close a first opening of the first channel disposed at one side of the first piston in the axial direction;
    a second opening and closing member configured to open and close a second opening of the second channel disposed at another side of the first piston in the axial direction; and
    a second piston that is provided on the first liquid chamber side of the cylinder to form a third liquid chamber for storing the liquid in the space in the cylinder, and that has a plurality of channels for communicating the first liquid chamber and the third liquid chamber with each other,
    when the moving and partitioning member is located apart from the one end and the other end of the movable region, the first and second openings are closed,
    when the moving and partitioning member abuts the first surface at the one end of the movable region, the first opening and closing member opens the first opening so that the first liquid chamber communicates the second liquid chamber,
    when that the moving and partitioning member abuts the second surface at the other end of the movable region, the second opening and closing member opens the second opening so that the first liquid chamber communicates the second liquid chamber,
    wherein the moving and partitioning member is separated from the first piston is movable from the one end to the other end in the axial direction of the movable region.

2. The pressure damping device according to claim 1, wherein the pressure damping device causes the second piston to generate damping force in a state in which the moving and partitioning member is moving between the one end and the other end and causes the first piston and the second piston to generate the damping force in a state in which the moving and partitioning member is located at the one end or the other end.

3. The pressure damping device according to claim 1, wherein the moving and partitioning member changes capacities of the first liquid chamber and the second liquid chamber, and limits the change of the capacities of the first liquid chamber and the second liquid chamber when a position of the moving and portioning member with respect to the first piston is fixed.

4. The pressure damping device according to claim 1, further comprising:
    a limiting member that is an annular member provided in the cylinder and configured to limit a flow of the liquid flowing in the axial direction of the cylinder,
    wherein the limiting member has a cutout formed in a part in a circumferential direction thereof.

5. The pressure damping device according to claim 1, further comprising:
    a damping material configured to reduce a bumping impact of the moving and partitioning member,
    wherein the damping material is provided on at least one of the one end side and the other end side in the movable region of the moving and partitioning member.

6. The pressure damping device according to claim 1, further comprising:

an urging member provided to be opposed to an axial direction end of the cylinder in the moving and partitioning member and configured to urge the moving and partitioning member in the axial direction of the cylinder.

7. The pressure damping device according to claim 1,
wherein the second opening and closing member is located between the moving and partitioning member and the first opening and closing member in the axial direction of the cylinder, and
the moving and partitioning member is not contact with either the first opening and closing member or the second opening and closing member.

8. The pressure damping device according to claim 1, wherein when the moving and partitioning member is separated from the one end and the other end of the movable region, the third channel is open for the liquid.

9. The pressure damping device according to claim 1, wherein the first channel is disposed in the cylinder separate from the second channel in a radial direction of the cylinder.

10. The pressure damping device according to claim 1, wherein the first and second surfaces are formed as part of the first piston and extend in a direction perpendicular to a longitudinal axis of the cylinder.

11. The pressure damping device according to claim 1, the moving and partitioning member is disposed in the axial direction of the cylinder separate from the first piston.

12. The pressure damping device according to claim 11, wherein the moving and partitioning member includes an opening section formed on an inner-surface and a seal material provided on an outer-surface thereof.

13. The pressure damping device according to claim 12, wherein the moving and partitioning member further includes a groove section in which the seal material is arranged.

14. The pressure damping device according to claim 11, wherein the first surface and the second surface are formed on a first ring and a second ring respectively, both of the rings having an annular shape.

15. The pressure damping device according to claim 14, wherein the second ring is made of a material that can suppress a collision noise created by the moving and partitioning member and thereof.

* * * * *